(12) United States Patent
Li et al.

(10) Patent No.: US 12,478,587 B1
(45) Date of Patent: Nov. 25, 2025

(54) FORMULATION FOR LACOSAMIDE

(71) Applicant: Shanghai Aucta Pharmaceuticals Co., Ltd., Shanghai (CN)

(72) Inventors: Shoufeng Li, Piscataway, NJ (US); Ye Huang, Piscataway, NJ (US); Fen Ren, Shanghai (CN); Bolun Zhang, Shanghai (CN)

(73) Assignee: SHANGHAI AUCTA PHARMACEUTICALS CO., LTD., Shanghai (CN)

( * ) Notice: Subject to any disclaimer, the term of this patent is extended or adjusted under 35 U.S.C. 154(b) by 0 days.

(21) Appl. No.: 19/047,536

(22) Filed: Feb. 6, 2025

(51) Int. Cl.
- *A61K 9/00* (2006.01)
- *A61K 9/16* (2006.01)
- *A61K 9/50* (2006.01)
- *A61K 31/165* (2006.01)

(52) U.S. Cl.
CPC .......... *A61K 9/5084* (2013.01); *A61K 9/0053* (2013.01); *A61K 9/1611* (2013.01); *A61K 9/1617* (2013.01); *A61K 9/1635* (2013.01); *A61K 9/1652* (2013.01); *A61K 31/165* (2013.01)

(58) Field of Classification Search
None
See application file for complete search history.

(56) References Cited

U.S. PATENT DOCUMENTS

| | | |
|---|---|---|
| 10,149,818 B2 | 12/2018 | Cawello et al. |
| 10,987,324 B2 | 4/2021 | Nguyen et al. |
| 11,278,502 B2 | 3/2022 | Kulkarni et al. |
| 11,337,943 B2 | 5/2022 | Lyu et al. |
| 12,042,474 B2 | 7/2024 | Lyu et al. |
| 2013/0251813 A1 | 9/2013 | Cawello et al. |
| 2018/0021307 A1 | 1/2018 | Kaminski et al. |
| 2018/0161282 A1 | 6/2018 | Nguyen et al. |
| 2019/0054009 A1 | 2/2019 | Cawello et al. |
| 2022/0280456 A1* | 9/2022 | Lyu .......... A61P 25/22 |

FOREIGN PATENT DOCUMENTS

| | | | |
|---|---|---|---|
| CA | 3148705 A1 * | 12/2020 | ........... A61K 31/165 |
| CN | 102670544 A | 9/2012 | |
| CN | 102885796 A | 1/2013 | |
| CN | 102920663 A | 2/2013 | |
| CN | 103561727 A | 2/2014 | |
| CN | 105534949 A | 5/2016 | |
| CN | 106619531 A | 5/2017 | |
| EP | 2496220 A1 | 9/2012 | |
| EP | 3753554 A1 | 12/2020 | |
| WO | 2011101863 A2 | 8/2011 | |
| WO | 2011107755 A2 | 9/2011 | |
| WO | 2015120110 A2 | 8/2015 | |

* cited by examiner

*Primary Examiner* — Susan T Tran
(74) *Attorney, Agent, or Firm* — FOX ROTHSCHILD LLP

(57) ABSTRACT

The patent document discloses a dosage form featuring a unique combination of extended-release and immediate-release components of the active ingredient. This dosage form allows for high drug loading, enabling once-daily administration while providing a sustained window of effective treatment with reduced fluctuations in drug concentration. The document also discloses a method for treating neurological or psychiatric diseases or conditions in a subject.

19 Claims, No Drawings

FORMULATION FOR LACOSAMIDE

FIELD OF INVENTION

The patent document pertains to a dosage form comprising a unique combination of extended release and immediate release components of the active ingredient. Also disclosed is a method of treating a neurological or psychiatric disease or condition in a subject.

BACKGROUND

Lacosamide, also known as R-2-acetamido-N-benzyl-3-methoxypropionamide, is a functionalized amino acid with the molecular formula C13H18N2O3 and a molecular weight of 250.30.

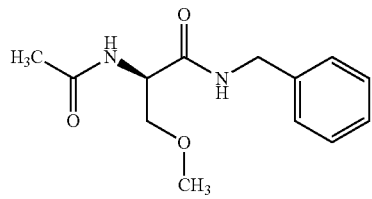 [SMILES: COC[C@@H](NC(C)=O)C(=O)NCc1ccccc1]

Lacosamide is an anticonvulsant that has been approved in several countries for the treatment of partial onset seizure. Partial seizures occur when abnormal electrical activity begins in only one part of the brain. Partial-onset seizures include simple partial seizures, where a person remains fully aware and does not lose consciousness (such as muscle jerking or stiffening, or sense things that are not actually present), and complex partial seizures, where a person loses awareness, stares blankly, or may seem to be daydreaming (such as picking at their clothing or repeating words or phrases). Lacosamide is well tolerated in the treatment of epilepsy, and the daily dose can reach 200-400 mg/day. The most common side effects are dizziness, diplopia, headache and nausea. The high daily dose administered as immediate release dosage form would potentially cause a high incidence of adverse reactions. The incidence of side effects of lacosamide directly correlates with the maximum steady-state plasma concentration (C max, ss) of lacosamide, and the efficacy of lacosamide in the treatment of epilepsy is mainly associated with the area under the steady-state plasma concentration-time curve (AUC, ss). A need exists for improved dosage forms of lacosamide.

SUMMARY OF THE INVENTION

This patent document describes a dosage form designed to meet the unmet medical need. By incorporating a unique combination of active ingredient components, the dosage form provides several advantages, including less fluctuations in drug blood concentrations and a more sustained duration of effective treatment compared to current products, such as immediate-release "Vimpat®" tablets and modified-release "Motpoly XR" capsules. Moreover, it enables a once-daily administration regimen.

An aspect of the patent document provides a capsule enclosing lacosamide or a pharmaceutically acceptable salt thereof, comprising:
(a) a first dosage form comprising a first portion of lacosamide or a pharmaceutically acceptable salt thereof, which comprises an immediate release (IR) portion of lacosamide or a pharmaceutically acceptable salt thereof and an extended release (ER) portion of lacosamide or a pharmaceutically acceptable salt thereof, wherein the first portion is released at a pH ranging from 1.0 to 8.0;
(b) a second dosage form comprising a second portion of lacosamide or a pharmaceutically acceptable salt thereof configured for extended release, wherein the second portion of lacosamide or a pharmaceutically acceptable salt thereof accounts for at least 10% of the total amount of lacosamide or a pharmaceutically acceptable salt thereof in the capsule, wherein the second portion of lacosamide is released substantially at a pH ranging from 5.5 to 8.0;
wherein, when administered once a day, the capsule provides at steady state a ratio between $C_{min,ss}$ and $C_{max,ss}$ ranging from about 1:1.2 to about 1:3 and a peak-trough fluctuation (PTF) ranging from about 35% to about 65%.

In some embodiments, the total amount of lacosamide or a pharmaceutically acceptable salt thereof in the capsule is selected so that, when orally administered once daily, the capsule provides at steady state a mean maximum plasma concentration ($C_{max}$) ranging from about 10 to about 14 µg/ml and a mean minimum plasma concentration ($C_{min}$) ranging from about 4 to about 10 µg/ml, and a PTF ranging from about 40% to about 60%.

In some embodiments, the capsule produces an $AUC_{0-6\,h}$, ss ranging from about 30 hr*µg/ml to 60 hr*µg/ml and a $AUC_{0-24\,h}$, ss ranging from about 180 to 250 hr*µg/ml.

In some embodiments, the total amount of lacosamide or a pharmaceutically acceptable salt thereof in the capsule is 400 mg.

In some embodiments, the second dosage form has a density ranging from 0.60 g/cm³ to 1.5 g/cm³, wherein the density of the second dosage form is higher than the density of the first dosage form.

In some embodiments, the second dosage form has an in vitro dissolution of the second portion of lacosamide or a pharmaceutically acceptable salt thereof according to the following:
(a) Less than 10% in 2 hours;
(b) Less than 40% in 3 hours; and
(c) 40% to 100% in 5 hours;
wherein the in vitro dissolution of the second dosage form is determined using a USP type 1 dissolution system (Basket Apparatus) at 100 rpm and at temperature of 37±0.5° C. in 900 ml of 0.1N HCL for 2 h hours and then followed by using a USP type 1 dissolution system (Basket Apparatus) at 100 rpm and at temperature of 37±0.5° C. in 900 ml of pH 6.8 phosphate buffer.

In some embodiments, the capsule is sized as 00 # or 00 #EL having an internal volume ranging from about 0.90 to about 1.05 ml.

In some embodiments, the second dosage form is in the form of tablet, wherein the second dosage form has a higher API loading (w/w) than the first dosage form.

In some embodiments, the capsule is characterized by an in vitro dissolution according to the following:
(a) 10%-30% in 1 hour;
(b) 30%-70% in 2 hours;
(c) 50~100% in 3 hours; and
(d) no less than 90% in 6 hours;
wherein the in vitro dissolution is determined using a USP type 1 dissolution system (Basket Apparatus) at 100 rpm and at temperature of 37±0.5° C. in 900 ml of pH 6.8 phosphate buffer.

In some embodiments, the first portion of lacosamide or a pharmaceutically acceptable salt thereof is about 30%, about 35%, about 40%, about 45%, about 50%, about 55%, about 60%, about 70%, about 80%, about 90%, or a range (e.g. 40%-90%, 40%-50%, 40%-60%, etc.) between any two of the aforementioned values, of the total amount of lacosamide or a pharmaceutically acceptable salt thereof in the capsule.

In some embodiments, the IR portion encloses the ER portion for the first dosage form. In some embodiments, the lacosamide or a pharmaceutically acceptable salt thereof of the ER portion is enclosed in an extended release layer.

In some embodiments, the second portion of lacosamide or a pharmaceutically acceptable salt thereof in the second dosage form is configured as a matrix for extended release. In some embodiments, an enteric layer enclosing the second portion, wherein the enteric layer comprises one or more pH dependent polymers for substantial release of the second portion of lacosamide or a pharmaceutically acceptable salt thereof at a pH ranging from 5.5 to 7.2 in vitro.

In some embodiments, the IR portion and in the ER portion in the first dosage form are in a ratio from 1:8 to 1:10 by weight. In some embodiments, the first portion and the second portion are in a ratio ranging from about 2:1 to about 9:1.

In some embodiments, the first portion of lacosamide or a pharmaceutically acceptable salt thereof is about 2%, about 3%, about 4%, about 5%, about 6%, about 8%, about 10%, about 15%, about 20%, about 30%, about 40%, about 50%, about 60%, or a range (e.g. 2%-50%, 3%-40%, 3%-30%, 3%-20%, 3%-10%, 4%-8%, etc.) between any two of the aforementioned values, by weight in the first dosage form. In some embodiments, the first dosage form comprises a plurality of beads or pellets, wherein each of the beads or pellets comprise the first portion of lacosamide or a pharmaceutically acceptable salt thereof.

Another aspect provides a method of treating a neurological or psychiatric disease or condition in a subject, comprising administering to the subject a dosage form described herein. In some embodiments, the disease or condition is selected from the group consisting of epilepsy, migraine, essential tremor, restless limb syndrome, cluster headache, neuralgia, neuropathic pain, Tourette's syndrome, infantile spasm, anxiety, bipolar disorder, psychosis, mania, schizophrenia, depression, dementia, autism, obsessive compulsive disorder, post-traumatic stress disorder, attention deficit hyperactivity disorder, impulse control disorder, borderline personality disorder, addiction, chronic neurodegenerative disorder, acute neurodegeneration, and amyotrophic lateral sclerosis. In some embodiments, the disease or condition is partial onset seizure. In some embodiments, the dosage form is a capsule containing 400 mg of lacosamide or a pharmaceutically acceptable salt thereof. In some embodiments, the dosage form is administered once a day orally.

DETAILED DESCRIPTION OF THE INVENTION

Various embodiments disclosed in this patent document pertain to a formulation of lacosamide or its pharmaceutically acceptable salt for oral administration. This formulation is designed to achieve more stable blood concentrations, reduce the frequency and quantity of doses, and enhance patient compliance. It provides a therapeutically effective amount of lacosamide with favorable pharmacokinetics. Additionally, the document describes a method for treating neurological or psychiatric diseases or conditions.

While the following text may reference or exemplify specific embodiments of a composition, an oral solution or a method of treating a disease, it is not intended to limit the scope of the composition, solution or method to such particular reference or examples. Various modifications may be made by those skilled in the art, in view of practical and economic considerations, such as the excipients of the composition and the interval of the administration of the solution for treating or preventing a disease or condition.

The articles "a" and "an" as used herein refers to "one or more" or "at least one," unless otherwise indicated. That is, reference to any element or component of an embodiment by the indefinite article "a" or "an" does not exclude the possibility that more than one element or component is present.

The term "about" and the like as used herein, when used in connection with a numerical variable, generally means that the value of the variable and all values of the variable are within the range of experimental error (e.g., within the 95% confidence interval for the mean) or within +10% or within +5% of the indicated value.

The term "enteric" or "enteric coating" as used herein refers to the use of one or more pH-dependent agents allow for most of an active pharmaceutical ingredient to be release in intestine (or no more than 10% in stomach).

The term "immediate release" or "IR" as used herein refers to release of more than or equal to about 85% or more than or equal to about 90% of an active pharmaceutical ingredient in an immediate release dosage form is released in less than or equal to about 30 minutes or 1 hour. In some embodiments, more than or equal to about 80% or more than or equal to about 90% or more than or equal to about 95% of an active pharmaceutical ingredient in an immediate release dosage form is released in less than or equal to about 30 minutes. In some embodiments, an immediate release dosage form VIMPAT® (Lacosamide) Film Coated Tablet is used as a reference listed drug (RLD), more than 80% of lacosamide or a pharmaceutically acceptable salt thereof in the immediate release dosage form VIMPAT® is released in less than or equal to about 30 minutes or about 1 hour. The in vitro dissolution can be determined using a USP type 2 dissolution system (Paddle Apparatus) at 75 rpm and a temperature of 37±0.5° C. in a dissolution medium of 900 ml 0.1 N HCl.

The term "matrix" as used herein refers to a supporting structure that contains the API within a continuous phase. For example, in an extended release tablet, the API can be mixed uniformly with extended release polymers to form a matrix.

The term "mean maximum plasma concentration" (mean $C_{max}$) refers to the average of the highest plasma concentrations of a drug observed across multiple subjects or dosing intervals in a study. It represents the central tendency of peak drug exposure in a given population or condition. In some embodiments, the mean $C_{max}$ is determined at steady state. In some embodiments, the mean $C_{max}$ is determined at a non-steady state.

The term "mean minimum plasma concentration" (mean $C_{min}$) refers to the average of the lowest plasma concentrations of a drug observed across multiple subjects or dosing intervals in a study. It represents the central tendency of trough drug levels, indicating the average minimum drug exposure within a given population or condition. In some embodiments, the mean $C_{min}$ is determined at steady state. In some embodiments, the mean $C_{min}$ is determined at a non-steady state.

The term "peak-trough fluctuation" or "PTF" as used herein is calculated as $100\%*(C_{max,ss}-C_{min,ss})/(AUC_{tau,ss}/tau)$, where $C_{max,ss}$ is the maximum steady-state plasma concentration of lacosamide, $C_{min,ss}$ is the minimum steady-state plasma concentration of lacosamide, $AUC_{tau,ss}$ is the area under the plasma concentration-time curve within a dosing interval tau under steady-state conditions, and tau is a dosing interval in hours. For a dosage form administered once daily, and the dosing interval is equal to 24 hours.

The term "pH independent" means that the nature of a substance does not depend on the pH value or is not affected by the pH value of the medium or solution under physiologically relevant pH environment.

The term "steady state" as used herein refers to a state where the blood plasma concentration curve for a given drug does not substantially fluctuate after repeated doses to dose of the formulation.

The term "subject" as used herein refers to an animal or a human. For instance, a subject in need of a treatment for an CNS disease can be a pediatric patient.

The term "treating" or "treatment" of any disease or condition refers, in some embodiments, to ameliorating the disease or disorder (i.e., arresting or reducing the development of the disease or at least one of the clinical symptoms thereof). In some embodiments "treating" or "treatment" refers to ameliorating at least one physical parameter, which may not be discernible by the subject. In some embodiments, "treating" or "treatment" refers to modulating the disease or disorder, either physically, (e.g., stabilization of a discernible symptom), physiologically, (e.g., stabilization of a physical parameter), or both. In some embodiments, "treating" or "treatment" refers to delaying the onset of the disease or disorder, or even preventing the same. "Prophylactic treatment" is to be construed as any mode of treatment that is used to prevent progression of the disease or is used for precautionary purpose for persons at risk of developing the condition.

The term "pharmaceutically acceptable salts" means salts of compounds of the present invention which are pharmaceutically acceptable, as defined above, and which possess the desired pharmacological activity. Non-limiting examples of such salts include acid addition salts formed with inorganic acids such as hydrochloric acid, hydrobromic acid, sulfuric acid, nitric acid, and phosphoric acid; or with organic acids such as 1,2-ethanedisulfonic acid, 2-hydroxy-ethanesulfonic acid, 2-naphthalenesulfonic acid, 3-phenyl-propionic acid, 4,4'-methylenebis(3-hydroxy-2-ene-1-carboxylic acid), 4-methylbicyclo[2.2.2]oct-2-ene-1-carboxylic acid, acetic acid, aliphatic mono- and dicarboxylic acids, aliphatic sulfuric acids, aromatic sulfuric acids, benzenesulfonic acid, benzoic acid, camphorsulfonic acid, carbonic acid, cinnamic acid, citric acid, cyclopentane-propionic acid, ethanesulfonic acid, fumaric acid, glucoheptonic acid, gluconic acid, glutamic acid, glycolic acid, heptanoic acid, hexanoic acid, hydroxynaphthoic acid, lactic acid, laurylsulfuric acid, maleic acid, malic acid, malonic acid, mandelic acid, methanesulfonic acid, muconic acid, 0-(4-hydroxybenzoyl)benzoic acid, oxalic acid, p-chlorobenzenesulfonic acid, phenyl-substituted alkanoic acids, propionic acid, p-toluenesulfonic acid, pyruvic acid, salicylic acid, stearic acid, succinic acid, tartaric acid, tertiary-butylacetic acid, and trimethylacetic acid. Pharmaceutically acceptable salts also include base addition salts which may be formed when acidic protons present are capable of reacting with inorganic or organic bases. Acceptable inorganic bases include sodium hydroxide, sodium carbonate, potassium hydroxide, aluminum hydroxide and calcium hydroxide. Non-limiting examples of acceptable organic bases include ethanolamine, diethanolamine, triethanolamine, tromethamine, and N-methylglucamine. It should be recognized that the particular anion or cation forming a part of any salt of this invention is not critical, so long as the salt, as a whole, is pharmacologically acceptable. Additional examples of pharmaceutically acceptable salts and their methods of preparation and use are presented in Handbook of Pharmaceutical Salts: Properties, and Use (P. H. Stahl & C. G. Wermuth eds., Verlag Helvetica Chimica Acta, 2002).

The term "therapeutically effective amount" refers to an amount of a compound effective to prevent, alleviate or ameliorate symptoms of disease or prolong the survival of the subject being treated. Determination of a therapeutically effective amount is well within the capability of those skilled in the art, especially in light of the detailed disclosure provided herein.

An aspect of the patent document provides a dosage form for lacosamide or a pharmaceutically acceptable salt thereof, which is an active pharmaceutical ingredient. (API). In some embodiments, the dosage form is a capsule. The dosage form generally contains a combination of a first dosage form and a second dosage form.

The first dosage form contains a first portion of lacosamide or a pharmaceutically acceptable salt thereof, wherein the first portion comprises an immediate release (IR) portion of lacosamide or a pharmaceutically acceptable salt thereof and an extended release (ER) portion of lacosamide or a pharmaceutically acceptable salt thereof, wherein the dosage form is release so that the first portion is substantially released at a pH ranging from 1.0 to 8.0 after being administered to a subject. The term "substantially released," unless otherwise specified, means that all or nearly all of the active pharmaceutical ingredient (API) is released to achieve the intended effect. In some embodiments, this includes the release of more than 95%, more than 98%, or more than 99% of the API from the specified dosage form under the identified conditions or in the specified medium.

The second dosage form comprises a second portion of lacosamide or a pharmaceutically acceptable salt thereof configured for extended release, wherein the second portion of lacosamide or a pharmaceutically acceptable salt thereof accounts for at least 10% of the total amount of lacosamide or a pharmaceutically acceptable salt thereof in the capsule, wherein the second dosage form is configured so that the second portion of lacosamide is substantially released at a pH ranging from 5.5 to 8.0 after being administered to the subject.

In some embodiments, the first dosage form and the second dosage form and their respective amounts of lacosamide or a pharmaceutically acceptable salt thereof are designed so that the capsule enclosing them, when administered once a day, provides at steady state a ratio between $C_{min,ss}$ and $C_{max,ss}$ ranging from about 1:1.0 to about 1:3.5, from about 1:1.2 to about 1:3.0, or from about 1:1.5 to about 1:2.5. Nonlimiting examples of the ratio include 1:1.2, 1:1.4, 1:1.6, 1:1.9, 1:2.0, 1:2.2, 1:2.4, 1:2.6, 1:2.8, 1:3.0, and any range between any two of aforementioned values.

In some embodiments, the dosage form (e.g. capsule) has a PTF of about 20%, about 30%, about 35%, about 40%, about 45%, about 50%, about 55%, about 60%, about 65%, about 70%, or a range between any two of the aforementioned values (e.g. from about 40% to about 65%, from about 40% to about 60%, from about 30% to about 50%, etc.). In some embodiments, the dosage form (e.g. capsule) when orally administered once daily, reduces PTF in vivo by at least 15%, at least 20%, at least 30%, at least 35%, at least 40%, at least 50%, at least 60% or at least 70% in comparison with an immediate release dosage form of the same daily dosage administered once or twice a day.

In some embodiments, the dosage form enclosing the first dosage form and the second dosage form is a capsule. The capsule can be of any suitable size, such as a size 000, 00el, 00, 0el, 0, 1, 2, 3, 4 or 5 capsule, which are sized according to international standards, each with a well-known length and volume. In some embodiments, a single capsule encloses about 100 mg, about 150 mg, about 200 mg, about 300 mg, about 350 mg, about 400 mg, about 450 mg, about 500 mg or any range between any two of the aforementioned amounts of the lacosamide or a pharmaceutically acceptable salt thereof.

The API in the first portion in the first dosage form is divided into an IR portion and an ER portion, wherein the ratio between the IR portion and the ER portion ranges from 1:4 to 1:20, 1:5 to 1:15, or 1:7 to 1:10. Nonlimiting examples of the ratio include 1:4, 1:5, 1:6, 1:7, 1:8, 1:9, 1:10, 1:11, 1:12, 1:13, 1:15, 1:17, 1:19, and a range between any two of the aforementioned ratios.

In some embodiments, the API of the second portion (in the second dosage form) and the API of the first portion (in the first dosage form) are in a ratio by weight of 3:1, 2:1, 1:1, 1:2, 1:3, 1:4, 1:5, 1:6, 1:7, 1:8, 1:9, 1:10, or a range between any two of the aforementioned values. Nonlimiting examples of the range of the ratio include 1:2 to 1:9, 1:2 to 1:6, and 1:3 to 1:5.

The IR portion and the ER portion of the first dosage form can be configured in any suitable manner. In some embodiments, the first dosage form comprises at least two layers (e.g. a dual-layer tablet, granule, particulate, multiple particulates, beads, pellets, mini tablets, etc.) which contain the IR portion and ER portion. In some embodiments, the IR portion is coated outside the extended release portion, optionally with an isolation layer between the two portions. In some embodiments, the first dosage form comprises a plurality of particulates, each of which includes the IR portion coated outside the ER portion. The API of the ER portion can be disposed in an ER matrix and/or coated with an extended release agent. In some embodiments, the ER portion further encloses an inert core such as a microcrystalline cellulose pellet, sugar pellet, starch pellet, silicon dioxide pellet, etc.), which can be prepared by conventional methods such as extrusion spheronization, fluidized bed, etc. In some embodiments, the IR portion and ER portion are not physically bound to each other, wherein the ER portion is in the form of one or more pellets or beads each having the API coated with an extended release layer and/or admixed with extended release agents in a matrix, and wherein the IR portion can be a tablet, a minitablet, or a bead containing the API only for immediate release.

The second dosage form, while in contact with the first dosage form when being enclosed in a capsule, is not connected or bonded to the first dosage form via any physical force or chemical interaction. The API of the second dosage form can be disposed in an extended release matrix and/or coated with an extended release agent (or ER layer). In some embodiments, the ER layer is substantially free from the API.

The second dosage form may also have an inert pellet core, which does not contain API. The second dosage form can be in the form of tablet, granule, particulate, multiple particulates, beads, pellets, or any suitable forms. In some embodiments, the second dosage form comprises one or more tablets.

To control the release of the API at a suitable pH environment from the second dosage form, a pH dependent layer can be coated to the dosage form in order to delay or minimize the release of the API until the dosage form reaches a medium of a target range of pH. In some embodiments, more than 80%, more than 85%, more than 90%, more than 95%, or more than 98% of the second portion of lacosamide in the second dosage form is released at a pH ranging from 6.0 to 8.0 after being administered to the subject. Preferably, the second portion of lacosamide is substantially released at a pH ranging from 6.0 to 8.0 after being administered to the subject.

The first dosage form and the second dosage form can be prepared by various existing technologies known in the art, such as by extrusion spheronization, fluidized bed and tablet press. In some embodiments, the dosage forms comprise at least one or more filler(s), including but not limited to povidone (PVP), crospovidone (PVPP), lactose, mannitol, sugars, microcrystalline cellulose, calcium hydrophosphate, corn starch, starch, silicon dioxide, hydroxypropyl cellulose, etc.

In some embodiments, the second dosage form in the capsule contains at least one filler, which can be selected from, for example, microcrystalline cellulose, starch, lactose, sucrose, dextrin, calcium hydrogen phosphate, calcium sulfate, calcium carbonate and mannitol. In some embodiments, the API in the second dosage form is about 35%, about 40%, about 45%, about 50%, about 60%, about 65%, about 70%, about 75%, about 80%, about 85%, or a range between any two of the aforementioned values (e.g 40%-80%, 40%-50%, 40%-60%, 70%-80%, etc.), by weight in the second dosage form. In some embodiments, the API in the second dosage form ranges from about 100 to about 150 mg. In some embodiments, the API in the second dosage form ranges from about 200 to about 400 mg. The second dosage form is preferably free from any API for immediate release.

In some embodiments, the second dosage form in the capsule is free from fillers. For instance, to keep a high drug loading, the second dosage form can be free from microcrystalline cellulose, starch, lactose, sucrose, dextrin, calcium hydrogen phosphate, calcium sulfate, calcium carbonate, mannitol or filler alike. In some embodiments, the API in the second dosage form ranges from about 200 to about 400 mg.

The amount of the first portion of lacosamide or a pharmaceutically acceptable salt thereof can range from about 40% to about 90%, from about 55% to about 95%, from about 65% to about 95%, from about 75% to about 95%, or from about 80% to about 90% by weight of the total amount of lacosamide or a pharmaceutically acceptable salt thereof in the dosage form (e.g. capsule). Nonlimiting examples of the amount of the first portion of lacosamide or a pharmaceutically acceptable salt thereof in the total API amount includes about 40%, about 45%, about 50%, about 55%, about 60%, about 65%, about 70%, about 75%, about 80%, about 85%, about 90%, about 95%, about 98%, or any range between any two of the aforementioned values.

In some embodiments, the first portion of lacosamide or a pharmaceutically acceptable salt thereof ranges from about 40% to about 80%, from about 45% to about 70%, or from about 50% to about 65% by weight in the first dosage form. Nonlimiting examples of the amount of the first portion of lacosamide or a pharmaceutically acceptable salt thereof in the first dosage form includes about 40%, about 45%, about 50%, 55%, about 60%, about 65%, about 70%, about 75%, about 80%, about 85%, or any range between any two of the aforementioned values.

In some embodiments, the second portion of lacosamide or a pharmaceutically acceptable salt thereof ranges from about 20% to about 90%, from about 45% to about 70%, or from about 50% to about 65% by weight in the second dosage form. Nonlimiting examples of the amount of the second portion of lacosamide or a pharmaceutically acceptable salt thereof in the second dosage form includes about 20%, about 30%, about 40%, about 45%, about 50%, 55%, about 60%, about 65%, about 70%, about 75%, about 80%, about 85%, or any range between any two of the aforementioned values.

In some embodiments, the first dosage form has a density ranging from 0.3 g/cm$^3$ to 1.2 g/cm$^3$, from 0.4 g/cm$^3$ to 1.0 g/cm$^3$, from 0.5 g/cm$^3$ to 0.8 g/cm$^3$, or from 0.6 g/cm$^3$ to 0.7 g/cm$^3$. Non-limiting examples of the density of the first dosage form include 0.3 g/cm$^3$, 0.4 g/cm$^3$, 0.5 g/cm$^3$, 0.6 g/cm$^3$, 0.7 g/cm$^3$, 0.8 g/cm$^3$, 0.9 g/cm$^3$, 1.0 g/cm$^3$, 1.1 g/cm$^3$, 1.2 g/cm$^3$ and a range between any two of the above density values.

In some embodiments, the second dosage form has a density ranging from 0.4 g/cm$^3$ to 2.0 g/cm$^3$, from 0.5 g/cm$^3$ to 1.8 g/cm$^3$, 0.5 g/cm$^3$ to 1.6 g/cm$^3$, 0.5 g/cm$^3$ to 1.3 g/cm$^3$, 0.7 g/cm$^3$ to 1.3 g/cm$^3$, 0.8 g/cm$^3$ to 1.2 g/cm$^3$, or 1.0 g/cm$^3$ to 1.3 g/cm$^3$. Non-limiting examples of the density of the second dosage form include 0.4 g/cm$^3$, 0.5 g/cm$^3$, 0.6 g/cm$^3$, 0.7 g/cm$^3$, 0.8 g/cm$^3$, 0.9 g/cm$^3$, 1.0 g/cm$^3$, 1.1 g/cm$^3$, 1.2 g/cm$^3$, 1.3 g/cm$^3$, 1.4 g/cm$^3$, 1.5 g/cm$^3$, 1.6 g/cm$^3$, 1.7 g/cm$^3$, 1.8 g/cm$^3$, 1.9 g/cm$^3$, 2.0 g/cm$^3$ and a range between any two of the above density values.

Unless otherwise specified, the density of the first or the second dosage form is calculated by dividing their weight over their respective volume. The volume can be determined by immersing the dosage form in purified water at 25° C. and measuring the volume of excluded water immediately. The density of the combined first and second dosage forms can be similarly determined. In some cases, the volume of a dosage form (e.g. small pellets or particulates) can be determined from the reading of a graduated cylinder filled with only the dosage form without the use of water.

In some embodiments, the second dosage form has a higher API loading (w/w) than the first dosage form. The API loading is calculated by dividing the weight of the first portion by the total weight of the first dosage form. The API loading of the second dosage form can be similarly determined.

The amount of the second portion of lacosamide or a pharmaceutically acceptable salt thereof can range from about 5% to about 40%, from about 10% to about 35%, from about 15% to about 30%, or from about 20% to about 25% by weight of the total amount of lacosamide or a pharmaceutically acceptable salt thereof in the dosage form (e.g. capsule). Nonlimiting examples of the amount of the second portion of lacosamide or a pharmaceutically acceptable salt thereof in the total API amount includes about 5%, about 10%, about 15%, about 20%, about 25%, about 30%, about 35%, about 40%, or any range between any two of the aforementioned values.

In some embodiments, the lacosamide or a pharmaceutically acceptable salt thereof ranges from about 40% to about 80%, from about 45% to about 70%, or from about 50% to about 65% by weight in the second dosage form. Nonlimiting examples of the amount of the lacosamide or a pharmaceutically acceptable salt thereof in the second dosage form includes about 40%, about 45%, about 50%, 55%, about 60%, about 65%, about 70%, about 75%, about 80%, about 85%, or any range between any two of the aforementioned values.

In some embodiments, the ratio between the API in the IR portion of the first dosage form and the API in the second dosage is 1:1.0, 1:1.2, 1:1.4, 1:1.6, 1:1.8, 1:2.0, 1:2.2, 1:2.4, 1:2.5, 1:2.6, 1:2.8, 1:3.0, 1:3.5, 1:4.0, 1:4.5, 1:5.0, 1:6.0, or a range between any two of the aforementioned ratios.

The first dosage form and the second dosage form each comprises one or more extended release agents. The ratio by weight between the ER agents in the second dosage from and the ER agents in the first dosage from in the IR portion of the first dosage form and the API in the second dosage is 1:1.0, 1:1.5, 1:2.0, 1:2.5, 1:2.6, 1:2.8, 1:3.0, 1:3.5, 1:4.0, 1:4.5, 1:5.0, 1:6.0, 1:7.0, 1:8.0, 1:9.0, 1:10.0, 1:11.0, 1:12.0, 1:13.0, 1:14.0, 1:15.0, or a range between any two of the aforementioned ratios.

In some embodiments, the dosage form that encloses the first dosage form and the second dosage form is a capsule. In some embodiments, the capsule has an internal volume of about 0.30 ml, 0.35 ml, 0.40 ml, 0.45 ml, 0.50 ml, 0.60 ml, 0.65 ml, 0.70 ml, 0.80 ml, 0.85 ml, 0.88 ml, 0.90 ml, 0.92 ml, 0.94 ml, 0.96 ml, 0.98 ml, 1.00 ml, 1.05 ml, 1.10 ml, 1.15 ml, or a range between any two of the aforementioned sizes.

In some embodiments, the capsule is sized as 00 # or 00 #EL. Size 00 # capsule has an internal body volume of about 0.91 ml and size 00 #EL capsule has an internal body volume of about 1.02 ml.

In some embodiments, the total amount of the API in the dosage form is 100 mg, 150 mg, 200 mg, 250 mg, 300 mg, 350 mg, 400 mg, 450 mg, 500 mg or a range between any two of the aforementioned amounts. In some embodiments, the dosage form is a capsule and the total amount of the API in the dosage form is 350 mg to 450 mg. In some embodiments, the total amount of the API is 400 mg.

The dosage form disclosed herein can also be characterized by its in vitro dissolution profile. Various factors, including the amounts and ratios of the API in different components (e.g. IR portion v. ER portion in the first portion, first portion API v. second portion API) of the dosage form the density of the components therein, the configuration of the extended release components, and the size of the capsule, may impact the in vitro dissolution profile.

In some embodiments, the dosage form has an in vitro dissolution characterized by one or more, or any combination of the following:
(a) by hour 1, the released API accounts for about 5%, about 8%, about 10%, about 11%, about 12%, about 13%, about 14%, about 15%, or any range between any two of the aforementioned values in the total amount of API in the dosage form (e.g. capsule);
(b) by hour 2, the released API accounts for about 10%, about 11%, about 12%, about 13%, about 14%, about 15%, about 16%, about 18%, about 20%, about 22%, about 24%, about 26%, or any range between any two of the aforementioned values in the total amount of API in the dosage form (e.g. capsule);
(c) by hour 3, the released API accounts for about 16%, about 18%, about 19%, about 20%, about 21%, about 22%, about 24%, about 26%, about 28%, or any range between any two of the aforementioned values in the total amount of API in the dosage form (e.g. capsule);
(d) by hour 4, the released API accounts for about 26%, about 28%, about 30%, about 32%, about 34%, about 36%, about 38%, about 40%, about 42%, about 44%, about 46%, 48%, about 50%, about 52%, about 54%, about 56%, 58%, about 60%, about 65%, or any range between any two of the aforementioned values in the total amount of API in the dosage form (e.g. capsule);
(e) by hour 5, the released API accounts for about 36%, about 38%, about 40%, about 42%, about 44%, about 46%, 48%, about 50%, about 52%, about 54%, about 56%, 58%, about 60%, about 65%, about 70%, about 75%, about 80%, or any range between any two of the aforementioned values in the total amount of API in the dosage form (e.g. capsule);
(f) by hour 6, the released API accounts for about 46%, about 48%, about 50%, about 52%, about 54%, about 56%, 58%, about 60%, about 65%, about 70%, about 75%, about 80%, about 85%, about 90%, or any range between any two of the aforementioned values in the total amount of API in the dosage form (e.g. capsule);
(g) by hour 8, the released API accounts for about 60%, about 65%, about 70%, about 75%, about 80%, about 85%, about 90%, about 95%, about 96%, about 98%, or any range between any two of the aforementioned values in the total amount of API in the dosage form (e.g. capsule);
(h) by hour 10, the released API accounts for about 75%, about 80%, about 85%, about 90%, about 95%, about 96%, about 98%, about 99%, or any range between any two of the aforementioned values in the total amount of API in the dosage form (e.g. capsule); and
(i) by hour 12, the released API accounts for about 85%, about 90%, about 95%, about 96%, about 98%, about 99%, or any range between any two of the aforementioned values in the total amount of API in the dosage form (e.g. capsule);
wherein the in vitro dissolution is determined using a USP type 1 dissolution system (Basket Apparatus) at 100 rpm and at temperature of 37±0.5° C. in 900 ml of 0.1N HCL for 2 h hours and then followed by using a USP type 1 dissolution system (Basket Apparatus) at 100 rpm and at temperature of 37±0.5° C. in 900 ml of pH 6.8 phosphate buffer for 10 hours.

In some embodiments, the capsule at the above described testing conditions has an in vitro dissolution characterized by one or more, any combination, or all of the following:
(a) 8%-20% or 8%-15% in 1 hour;
(b) 10%-30% or 10%-25% in 2 hours;
(c) 25%-55%, 28%-52%, or 30%-55%, in 3 hours;
(d) 40%-75% or 55%-75% in 4 hours;
(e) 45%-95% or 65%-90% in 5 hours;
(f) 50%-100% or 70%-95% in 6 hours;
(g) no less than 70% or no less than 90% in 8 hours;
(h) no less than 80% or no less than 95% in 10 hours.

In some embodiments, the second dosage form in the capsule has an in vitro dissolution characterized by one or more, any combination, or all of the following:
(a) about 2%, about 4%, about 6%, about 10%, about 12%, or any range between any two of the aforementioned values, or less than 15%, less than 12%, less than 10%, less than 8%, or less than 6% in 2 hours;
(b) about 10%, about 15%, about 20%, about 25%, about 30%, about 35%, or any range between any two of the aforementioned values, or less than 40%, less than 35%, less than 30%, or less than 25%, in 3 hours; and
(c) 30%, 40%, 45%, 50%, 55%, 60%, 65%, 70%, 75%, 80%, 85%, 90%, or any range between any two of the aforementioned values, or 30% to 100%, 40% to 100%, 50% to 100%, 60% to 90%, or 70% to 90% in 5 hours;
wherein the in vitro dissolution of the second dosage form is determined using a USP type 1 dissolution system (Basket Apparatus) at 100 rpm and at temperature of 37±0.5° C. in 900 ml of 0.1N HCL for 2 h hours and then followed by using a USP type 1 dissolution system (Basket Apparatus) at 100 rpm and at temperature of 37±0.5° C. in 900 ml of pH 6.8 phosphate buffer.

In some embodiments, the second dosage form in the capsule at the above described testing conditions has an in vitro dissolution characterized by one or more, any combination, or all of the following
(a) about 2%, about 4%, about 6%, about 10%, about 12%, or any range between any two of the aforementioned values, or less than 10%, less than 8%, or less than 6% in 2 hours;
(b) 10%, 12%, 15%, 18%, 20%, or any range between any two of the aforementioned values in 3 hours;
(c) 20%, 22%, 25%, 28%, 30%, 35%, or any range between any two of the aforementioned values in 4 hours;
(d) 40%, 45%, 50%, 55%, or any range between any two of the aforementioned values in 5 hours;
(e) 50%, 60%, 65%, 70%, 75%, 80%, or any range between any two of the aforementioned values in 6 hours; and
(f) more than 75%, more than 80%, more than 85%, or more than 90%, in 8 hours.

In some embodiments, the second dosage form in the capsule at the above described testing conditions has an in vitro dissolution characterized by one or more, any combination, or all of the following
(a) less than 10% in 2 hours;
(b) less than 40% in 3 hours; and
(c) 40% to 100% in 5 hours.

In some embodiments, the second dosage form in the capsule at the above described testing conditions has an in vitro dissolution characterized by one or more, any combination, or all of the following
(a) More than about 15% in 3 hours
(b) More than about 15% in 4 hours and
(c) More than about 10% in 5 hours In some embodiments, the capsule enclosing the first dosage form and the second dosage form is characterized by an in vitro dissolution according to the following:
(a) about 6%, about 10%, about 12%, about 15%, about 20%, about 25%, about 30%, or any range between any two of the aforementioned values (e.g. 10%-30%, 8%-15%, etc.) in 1 hour;
(b) 15%, 20%, 25%, 30%, 35%, 40%, 50%, 60%, 70%, or any range between any two of the aforementioned (e.g. 15%-35%, 30%-70%, etc.) in 2 hours;
(c) 50%, 60%, 65%, 70%, 75%, 80%, 90%, 100%, or any range between any two of the aforementioned values (e.g. 50%-100%, 40%-70%, etc.) in 3 hours; and
(d) 80%, 90%, 100%, or no less than 80%, no less than 85%, no less than 90%, or no less than 95% in 6 hours;
wherein the in vitro dissolution is determined using a USP type 1 dissolution system (Basket Apparatus) at 100 rpm and at temperature of 37±0.5° C. in 900 ml of pH 6.8 phosphate buffer.

In some embodiments, the dosage form (e.g. capsule) is configured to provide one or more of the following AUC characterizations when administered orally once a day:
(a) $AUC_{0-3\,h}$ is 15000 hr*ng/ml, 15100 hr*ng/ml, 15200 hr*ng/ml, 15300 hr*ng/ml, 15400 hr*ng/ml, 15500 hr*ng/ml, 15600 hr*ng/ml, 15700 hr*ng/ml, 15800 hr*ng/ml, 15900 hr*ng/ml, 16000 hr*ng/ml, 16100 hr*ng/ml, 16500 hr*ng/ml, 16700 hr*ng/ml, 16900 hr*ng/ml, 17000 hr*ng/ml, 17500 hr*ng/ml, 17700 hr*ng/ml, 17900 hr*ng/ml, 18000 hr*ng/ml, 18100 hr*ng/ml, 18300 hr*ng/ml, 18500 hr*ng/ml, 18800 hr*ng/ml, 18900 hr*ng/ml, 19000 hr*ng/ml, 19500 hr*ng/ml, 19700 hr*ng/ml, 19900 hr*ng/ml, 20000 hr*ng/ml, 21000 hr*ng/ml, 22000 hr*ng/ml, 23000 hr*ng/ml, 24000 hr*ng/ml, 25000 hr*ng/ml, 26000 hr*ng/ml, 27000 hr*ng/ml or any range between any two of the above disclosed values;

(b) $AUC_{0-6\,h}$ is 40000 hr*ng/ml, 41000 hr*ng/ml, 42000 hr*ng/ml, 43000 hr*ng/ml, 44000 hr*ng/ml, 45000 hr*ng/ml, 46000 hr*ng/ml, 47000 hr*ng/ml, 48000 hr*ng/ml, 49000 hr*ng/ml, 50000 hr*ng/ml, 51000 hr*ng/ml, 52000 hr*ng/ml, 53000 hr*ng/ml, 54000 hr*ng/ml, 55000 hr*ng/ml, 56000 hr*ng/ml, 57000 hr*ng/ml, 58000 hr*ng/ml, 59000 hr*ng/ml, 60000 hr*ng/ml, 61000 hr*ng/ml, 62000 hr*ng/ml, 63000 hr*ng/ml, 64000 hr*ng/ml, 65000 hr*ng/ml, 66000 hr*ng/ml, 67000 hr*ng/ml or any range between any two of the above disclosed values;

(c) $AUC_{0-8\,h}$ is 50000 hr*ng/ml, 51000 hr*ng/ml, 52000 hr*ng/ml, 53000 hr*ng/ml, 54000 hr*ng/ml, 55000 hr*ng/ml, 56000 hr*ng/ml, 57000 hr*ng/ml, 58000 hr*ng/ml, 59000 hr*ng/ml, 60000 hr*ng/ml, 61000 hr*ng/ml, 62000 hr*ng/ml, 63000 hr*ng/ml, 64000 hr*ng/ml, 65000 hr*ng/ml, 66000 hr*ng/ml, 67000 hr*ng/ml, 68000 hr*ng/ml, 69000 hr*ng/ml, 70000 hr*ng/ml, 71000 hr*ng/ml, 72000 hr*ng/ml, 73000 hr*ng/ml, 74000 hr*ng/ml, 75000 hr*ng/ml, 76000 hr*ng/ml, 77000 hr*ng/ml, 78000 hr*ng/ml, 79000 hr*ng/ml, 80000 hr*ng/ml, 81000 hr*ng/ml, 82000 hr*ng/ml, 83000 hr*ng/ml, 84000 hr*ng/ml, 85000 hr*ng/ml, 86000 hr*ng/ml, 87000 hr*ng/ml, 88000 hr*ng/ml, 89000 hr*ng/ml, 90000 hr*ng/ml, 91000 hr*ng/ml, 92000 hr*ng/ml, 93000 hr*ng/ml, or any range between any two of the above disclosed values;

(d) $AUC_{0-12\,h}$ is 90000 hr*ng/ml, 91000 hr*ng/ml, 92000 hr*ng/ml, 93000 hr*ng/ml, 94000 hr*ng/ml, 95000 hr*ng/ml, 96000 hr*ng/ml, 97000 hr*ng/ml, 98000 hr*ng/ml, 99000 hr*ng/ml, 100000 hr*ng/ml, 110000 hr*ng/ml, 120000 hr*ng/ml, 130000 hr*ng/ml, 140000 hr*ng/ml, 150000 hr*ng/ml or any range between any two of the above disclosed values.

In some embodiments, the dosage form (e.g. capsule) provides $AUC_{0-24\,h,\,ss}$ of 120, 130, 140, 150, 160, 170, 180, 190, 200, 220, 230, 240, 250 hr*µg/ml, or a range (e.g. 120-200, 140-180, 150-170 µg/ml, etc.) between any two of the aforementioned values or more than 220 hr*µg/ml.

In some embodiments, the dosage form (e.g. capsule) provides $AUC_{0-6,\,ss}$ of 20, 30, 40, 50, 60, 70, 80, 90, 100 hr*µg/ml, or a range (e.g. 20-80, 30-60, 40-50 µg/ml, etc.) between any two of the aforementioned values or more than 100 hr*µg/ml.

In some embodiments, the total amount of lacosamide or a pharmaceutically acceptable salt thereof is selected so that, when administered once a day, the dosage from provides at steady state a mean maximum plasma concentration (Cmax) of 8, 10, 12, 14, 16, 18 µg/ml or any range between any two of the aforementioned values (e.g. 8-15, 10-14, 10-12 µg/ml, etc.) and/or a mean minimum plasma concentration (Cmin) of 2, 3, 4, 5, 6, 7, 8, 9, 10 µg/ml or any range (3-9, 4-8, 5-7 µg/ml, etc.) between any two of the aforementioned values. In some embodiments, the total amount of lacosamide or a pharmaceutically acceptable salt thereof ranges from 350 mg to 450 mg. In some embodiments, the total amount of lacosamide or a pharmaceutically acceptable salt thereof is about 400 mg.

In some embodiments, the total amount of the API in the dosage form (e.g. capsule) is about 300 mg, which when administered once a day, provides at steady state a mean maximum plasma concentration ($C_{max}$) about 3.5 µg/ml, 4.0 µg/ml, 4.5 µg/ml, 5.0 µg/ml, 5.5 µg/ml, 6.0 µg/ml, 6.5 µg/ml, 7.0 µg/ml, 7.5 µg/ml, 8.0 µg/ml, 8.5 µg/ml, 9.0 µg/ml, 9.5 µg/ml, 10.0 µg/ml, 10.5 µg/ml, 11.0 µg/ml, 11.5 µg/ml, 12.0 µg/ml, 12.5 µg/ml, 13.0 µg/ml or any range between any two of the above disclosed values.

In some embodiments, the total amount of the API in the dosage form (e.g. capsule) is about 300 mg, which when administered once a day, provides at steady state a mean minimum plasma concentration ($C_{min}$) about 0.1 µg/ml, 0.2 µg/ml, 0.3 µg/ml, 0.4 µg/ml, 0.5 µg/ml, 0.8 µg/ml, 1.0 µg/ml, 1.2 µg/ml, 1.4 µg/ml, 1.5 µg/ml, 1.8 µg/ml, 2.0 µg/ml, 2.4 µg/ml, 2.6 µg/ml, 2.8 µg/ml, 3.0 µg/ml, 3.5 µg/ml, 3.7 µg/ml, 3.9 µg/ml, 4.0 µg/ml, 4.5 µg/ml, 5.0 µg/ml, 5.5 µg/ml, 6.0 µg/ml, 6.5 µg/ml, 7.0 µg/ml, 7.5 µg/ml, 8.0 µg/ml, 8.5 µg/ml, 9.0 µg/ml or any range between any two of the above disclosed values In some embodiments, the total amount of the API in the dosage form (e.g. capsule) is about 200 mg, which when administered once a day, provides at steady state a mean maximum plasma concentration ($C_{max}$) about 3.5 µg/ml, 4.0 µg/ml, 4.5 µg/ml, 5.0 µg/ml, 5.5 µg/ml, 6.0 µg/ml, 6.5 µg/ml, 7.0 µg/ml, 7.5 µg/ml, 8.0 µg/ml, 8.5 µg/ml, 9.0 µg/ml, 9.5 µg/ml, 10.0 µg/ml, 10.5 µg/ml, 11.0 µg/ml, 11.5 µg/ml, 12.0 µg/ml, 12.5 µg/ml, 13.0 µg/ml or any range between any two of the above disclosed values In some embodiments, the total amount of the API in the dosage form (e.g. capsule) is about 200 mg, which when administered once a day, provides at steady state a mean minimum plasma concentration ($C_{min}$) about 0.8 µg/ml, 1.0 µg/ml, 1.2 µg/ml, 1.4 µg/ml, 1.5 µg/ml, 1.8 µg/ml, 2.0 µg/ml, 2.4 µg/ml, 2.6 µg/ml, 2.8 µg/ml, 3.0 µg/ml, 3.5 µg/ml, 3.7 µg/ml, 3.9 µg/ml, 4.0 µg/ml, 4.5 µg/ml, 5.0 µg/ml, 5.5 µg/ml, 6.0 µg/ml, 6.5 µg/ml, 7.0 µg/ml, 7.5 µg/ml, 8.0 µg/ml, 8.5 µg/ml, 9.0 µg/ml or any range between any two of the above disclosed values.

In some embodiments, the total amount of the API in the dosage form (e.g. capsule) is about 150 mg, which when administered once a day, provides at steady state a mean maximum plasma concentration ($C_{max}$) about 2.0 µg/ml, 2.4 µg/ml, 2.6 µg/ml, 2.8 µg/ml, 3.0 µg/ml, 3.25 µg/ml, 3.5 µg/ml, 3.7 µg/ml, 3.75 µg/ml, 3.8 µg/ml, 4.0 µg/ml, 4.5 µg/ml, 5.0 µg/ml, 5.5 µg/ml, 6.0 µg/ml, 6.5 µg/ml, 7.0 µg/ml, 7.5 µg/ml, 8.0 µg/ml, 8.5 µg/ml, 9.0 µg/ml, 9.5 µg/ml, 10.0 µg/ml, 10.5 µg/ml, 11.0 µg/ml, 11.5 µg/ml, 12.0 µg/ml, 12.5 µg/ml, 13.0 µg/ml or any range between any two of the above disclosed values In some embodiments, the total amount of the API in the dosage form (e.g. capsule) is about 150 mg, which when administered once a day, provides at steady state a mean minimum plasma concentration ($C_{min}$) about 0.1 µg/ml, 0.2 µg/ml, 0.3 µg/ml, 0.4 µg/ml, 0.5 µg/ml, 0.8 µg/ml, 1.0 µg/ml, 1.2 µg/ml, 1.4 µg/ml, 1.5 µg/ml, 1.8 µg/ml, 2.0 µg/ml, 2.4 µg/ml, 2.6 µg/ml, 2.8 µg/ml, 3.0 µg/ml, 3.5 µg/ml, 3.7 µg/ml, 3.8 µg/ml, 3.9 µg/ml, 4.0 µg/ml, 4.5 µg/ml, 5.0 µg/ml, 5.5 µg/ml, 6.0 µg/ml or any range between any two of the above disclosed values In some embodiments, the total amount of the API in the dosage form (e.g. capsule) is about 100 mg, which when administered once a day, provides at steady state a mean maximum plasma concentration ($C_{max}$) about 0.1 µg/ml, 0.2 µg/ml, 0.3 µg/ml, 0.4 µg/ml, 0.5 µg/ml, 0.8 µg/ml, 1.0 µg/ml, 1.2 µg/ml, 1.4 µg/ml, 1.5 µg/ml, 1.8 µg/ml, 2.0 µg/ml, 2.4 µg/ml, 2.6 µg/ml, 2.8 µg/ml, 3.0 µg/ml, 3.5 µg/ml, 3.7 µg/ml, 3.8 µg/ml, 3.9 µg/ml, 4.0 µg/ml, 4.5 µg/ml, 5.0 µg/ml, 5.5 µg/ml, 6.0 µg/ml or any range between any two of the above disclosed values In some embodiments, the total amount of the API in the dosage form (e.g. capsule) is about 100 mg, which when administered once a day, provides at steady state a mean minimum plasma concentration ($C_{min}$) about 0.1 µg/ml, 0.2 µg/ml, 0.3 µg/ml, 0.4 µg/ml, 0.5 µg/ml, 0.8 µg/ml, 1.0 µg/ml, 1.2 µg/ml, 1.4 µg/ml, 1.5 µg/ml, 1.8 µg/ml, 2.0 µg/ml, 2.4 µg/ml, 2.6 µg/ml, 2.8 µg/ml, 3.0 µg/ml, 3.5 µg/ml, 3.7 µg/ml, 3.8 µg/ml, 3.9 µg/ml, 4.0 µg/ml, 4.5 µg/ml, 5.0 µg/ml, 5.5 µg/ml, 6.0 µg/ml and any range between any two of the above disclosed values.

In some embodiments, the dosage form (e.g. capsule) administered once daily contains 400 mg of the API for a daily dose of 400 mg. In some embodiments, the dosage form administered once daily contains 200 mg of the API and two capsules are administered for a daily dose of 400 mg. In some embodiments, the dosage form administered once daily contains 100 mg of the API and four capsules are administered for a daily dose of 400 mg. Alternative combinations includes a capsule containing 100 mg API and a capsule containing 300 mg API.

The first dosage form and the second dosage form each include one or more suitable excipients, including for example, extended release agent, binder, lubricant, pore-forming agent, glidants, and plasticizer. The binding agents include but are not limited to povidone (PVP), hydroxypropyl cellulose (HPC), methyl cellulose (MC), hydroxypropyl methyl cellulose (HPMC), sodium carboxymethyl cellulose, starch slurry, gelatin, arabic gum and mixtures thereof. The pore-forming agents include but are not limited to polyvinyl alcohol, hydroxypropyl methylcellulose, lactose, glucose, sodium lauryl sulfate, soluble sugars or salts, polyethylene glycolic, polyethylene glycol, hydroxypropyl methyl cellulose, hydroxypropyl cellulose, and polyvinyl pyrrolidone.

In some embodiments, the dosage forms further include an isolation layer or protective layer, including but not limited to opadry (Opadry®), talcum, magnesium stearate, hydroxypropyl methyl cellulose, hydroxypropyl cellulose, and the like.

The extended release agent controls the dissolution of the API from the dosage forms. Nonlimiting examples of pH independent extended release agents include ethyl cellulose, methyl cellulose, cellulose acetate, polyvinyl acetate, polyacrylate, polymethacrylate, ammonio methacrylate copolymer type A (ethyl acrylate/methyl methacrylate/trimethylamino ethyl methacrylate chloride copolymer (1:2:0.2)), ammonio methacrylate copolymer B type (ethyl acrylate/methyl methacrylate/trimethylamino ethyl methacrylate chloride copolymer (1:2:0.1)), ethyl acrylate/methyl methacrylate copolymer, and any mixtures thereof, and the like. In some embodiments, the pH independent extended release agent is selected from the group consisting of Eudragit RS100 (ethyl acrylate/methyl methacrylate/trimethylamino ethyl methacrylate chloride copolymer (1:2:0.1)), Eudragit RL100 (ethyl acrylate/methyl methacrylate/trimethylamino ethyl methacrylate chloride copolymer (1:2:0.2)), and a combination thereof. In some embodiments, the pH independent extended release agent is a combination of Eudragit RS100 (ethyl acrylate/methyl methacrylate/trimethylamino ethyl methacrylate chloride copolymer (1:2:0.1)) and Eudragit RL100 (ethyl acrylate/methyl methacrylate/trimethylamino ethyl methacrylate chloride copolymer (1:2: 0.2)), the wherein the ratio of Eudragit RS100 (ethyl acrylate/methyl methacrylate/trimethylamino ethyl methacrylate chloride copolymer (1:2:0.1)) to the Eudragit RL100 (ethyl acrylate/methyl methacrylate/trimethylamino ethyl methacrylate chloride copolymer (1:2:0.2)) is greater than or equal to 3:1. In some embodiments, the pH independent extended release agent is Eudragit RS100 (ethyl acrylate/methyl methacrylate/trimethylamino ethyl methacrylate chloride copolymer (1:2:0.1)). In a preferred embodiment, the pH independent extended release agent is selected from ethyl cellulose, and its viscosity specifications include but are not limited to ethyl cellulose 7 cP, ethyl cellulose 10 cP, ethyl cellulose 20 cP, and ethyl cellulose 100 cP, preferably, the viscosity specification of ethyl cellulose is 7 cP.

Enteric coating may employ pH dependent polymers, which allow the release of the API at a specific pH range. Nonlimiting examples of pH dependent polymers include methacrylic acid and ethyl acrylate copolymer dispersion 1 30 d-55, methyl acrylate, methyl methacrylate and methacrylic acid (7:3:1) co polymer 280000 dispersion fs30d, cellulose acetate phthalate, 2-hydroxypropyl methylcellulose phthalate, polyvinyl acetate phthalate, shellac, and acacia gum. The amount of the pH dependent polymers may be 20%, 30%, 40%, 50%, 60%, 70%, 80%, 90% or a range between any two of the aforementioned values by weight in the dosage form (e.g. the second dosage form enclosed in a capsule) that the polymers control the release of the API.

The extended release agent may be a hydrophilic polymer, a hydrophobic polymer, and any mixture. Nonlimiting examples include:

(a) Ethyl cellulose which is 6~100 Solution viscosity (mPa s) measured typically at 25° C. using 5% w/v ethyl cellulose dissolved in a solvent blend of 80% toluene: 20% ethanol (w/w).

(b) Cellulose Acetate which is 10~230 viscosity (mPa s) used by 10% w/w solutions in organic solvents (c) Polyacrylic resin which is selected from the group consisting of Eudragit L 100, Eudragit L 100-55, Eudragit L 30 D-55, Eudragit S 100, Eudragit FS 30 D, Eudragit RL 100, Eudragit RL PO, Eudragit RL 30 D, Eudragit RS 100, Eudragit RS PO, Eudragit RS 30 D Further nonlimiting examples of hydrophilic polymers include cellulose derivatives such as methyl cellulose, hydroxypropyl methylcellulose, hydroxyethyl cellulose, hydroxypropyl cellulose, hydroxyethyl methylcellulose, carboxymethylcellulose and sodium carboxymethylcellulose; vinyl pyrrolidone polymers such as polyvinylpyrrolidone and copolymers of vinyl pyrrolidone and vinyl acetate; polysaccharides; gums of plant, animal, mineral or synthetic origin; polysaccharide such as alginic acid derivatives; chitosan, gellan and xanthan gum; alkylene oxide such as polyethylene oxide; polyacrylic acid polymers such as carbomer; and mixtures thereof. Further nonlimiting examples of hydrophobic polymers include ethyl cellulose; methacrylic acid derivatives; cellulose acetate and its derivatives; poly vinyl alcohols and its derivatives; polyacrylamide derivatives; and mixtures thereof. Nonlimiting examples of was include glycerol palmitostearate; beeswax; glycol wax; castor wax; carnauba wax; glycerol monostearate; stearyl alcohol; glycerol behenic acid ester; cetyl alcohol; natural and synthetic glycerides; waxes; fatty acids; hydrogenated vegetable oil; and mixtures thereof.

In some embodiments, the weight ratio of API to the corresponding extended release agent (the ER agent that controls the release of the API) in the first dosage form and/or the second dosage form is about 15:1 to about 1:1, about 15:1 to about 2:1, about 10:1 to about 2:1, about 8:1 to about 2:1, about 8:1 to about 3:1, about 10:1 to about 4:1, about 6:1 to about 3:1, about 5:1 to about 2:1. Non-limiting exemplary ratios include about 10:1, about 9:1, about 8:1, about 7:1, about 6:1, about 5:1, about 4:1, about 3:1, about 10:1, about 1:1 and a range between any two of the aforementioned ratios.

In some embodiments, the capsule contains multiple beads or pellets as the first dosage form and one or more tablets as the second dosage form, wherein each of the beads or pellets comprises:
(1) an inert core
(2) an ER portion of lacosamide or a pharmaceutically acceptable salt thereof enclosing the inert core, wherein the ER portion is enclosed by an extended release layer comprising one or more extended release polymer and optionally a pore-forming agent
(3) an IR portion of lacosamide or a pharmaceutically acceptable salt thereof enclosing the extended release layer.
each of the one or more tablets includes:
(1) an active core comprising lacosamide or a pharmaceutically acceptable salt thereof and one or more extended release polymers in a matrix or compressed extended release granules, optionally the core further comprises an inert inner core;
(2) a delay release layer comprising one or more pH dependent polymers.

In some embodiments, the capsule contains multiple beads or pellets as the first dosage form and one or more tablets as the second dosage form, wherein the one or more of a first group of beads or pellets comprises:
(1) a core comprising lacosamide or a pharmaceutically acceptable salt thereof, wherein the core is free from extended release polymers;
(2) an extended release layer enclosing the core, wherein the ER layer comprises one or more extended release polymers and a pore forming agent;
one or more of a second group of the beads or pellets in the first dosage form comprises:
(1) lacosamide or a pharmaceutically acceptable salt thereof and binders for immediate release without any extended release agents
each of the one or more tablets includes:
(1) an active core comprising lacosamide or a pharmaceutically acceptable salt thereof and one or more extended release polymers in a matrix, or compressed extended release granules, optionally the core further comprises an inert inner core;
(2) a delay release layer comprising one or more pH dependent polymers In some embodiments, the capsule contains one or more tablets or secondary capsules smaller than the enclosing capsule) as the first dosage form and one or more tablets or secondary capsules (as the second dosage form, wherein:
each of the one or more tablets or secondary capsules for the first dosage form comprises:
(1) an ER portion of lacosamide or a pharmaceutically acceptable salt thereof in a matrix with one or more extended release polymers;
(2) an IR portion of lacosamide or a pharmaceutically acceptable salt thereof enclosing the ER portion
each of the one or more tablets or secondary capsules for the second dosage form includes:
(1) an active core comprising lacosamide or a pharmaceutically acceptable salt thereof in a matrix with one or more extended release polymers and/or being coated with an extended release layer;
(2) a delay release layer comprising one or more pH dependent polymers In some embodiments, the capsule contains one or more tablets or secondary capsules as the first dosage form, wherein:
each of the one or more tablets for the first dosage form comprises:
(1) an ER layer comprising an ER portion of lacosamide or a pharmaceutically acceptable salt thereof in a matrix with one or more extended release polymer;
(2) an IR layer comprising an IR portion of lacosamide or a pharmaceutically acceptable salt thereof, wherein the IR layer and the ER layer are compressed together into a single tablet The IR portion and the ER portion of the first dosage form can also be independently in the form of tablet, mini-tablet, particulates, pellet, bead, or powder. The IR portion and the ER portion can be integrated into a single unit (e.g. tablet, bead, secondary capsule, etc.). They can also be configured into separate units. Likewise, the second dosage form can be tablet, mini-tablet, particulates, pellet or bead, which are optionally enclosed in a secondary capsule.

The amounts and selection of the API in each dosage forms, the excipients, and their respective ratios are as described above. When a component encloses another, the enclosing component unless otherwise specified is not necessarily in direct contact with the enclosed component. For instance, where the IR portion encloses the ER portion or the ER layer the first dosage form, there can be an isolation layer or an additional layer of excipients between the IR portion and the component being enclosed. In any embodiment disclosed herein, an extended release component may comprise an inert core which the API can be coated onto.

The extended release of an API can be based on any suitable mechanism. For example, the API of the ER portion in the first dosage form or the API of the second dosage form can be controlled by a membrane, which comprises a water insoluble polymer (e.g. ethyl cellulose) and a water soluble polymer (e.g. polyethylene glycol). The easily dissolved polymer leaves pores for the API to be released from the dosage form. In an example of a matrix controlled release mechanism, API is slowly release when water comes into contact with a gel matrix.

In a dosage form configured for API release at a specific range of pH, different polymers (e.g. Eudragit FS 30D and Eudragit L 30D-55) can be mixed in a predetermined ratio to adjust the pH affinity (e.g. 5.5-7.0) of the dosage form for API dissolution.

Another aspect of the patent document provides a method for the treatment of a neurological or psychiatric disease or condition. The method includes administering to a subject in need thereof a dosage form disclosed herein.

In some embodiments, the disease or condition includes but is not limited to epilepsy, migraine, essential tremor, restless limb syndrome, cluster headache, neuralgia, neuropathic pain, Tourette's syndrome, infantile spasm, anxiety, bipolar disorder, psychosis, mania, schizophrenia, depression, dementia, autism, obsessive compulsive disorder, posttraumatic stress disorder, attention deficit hyperactivity disorder, impulse control disorder, borderline personality disorder, addiction, chronic neurodegenerative disorder, acute neurodegeneration, and amyotrophic lateral sclerosis. Preferably, the disease or condition is partial onset seizure.

Epileptic seizures are mainly of two types: partial seizures and generalized seizures. Partial seizures can again be of three type; i.e. simple partial, complex partial and partial with secondarily generalized tonic clonic seizure. Generalized seizures are classified as absence seizure, myoclonic seizure and tonic-clonic seizure.

Other examples of the disease or condition to be treated with the dosage form disclosed herein include anxiety disorder, allodynia, motoneuron disorder, acute and chronic pain (e.g. rheumatic inflammatory pain), central neuropathic pain, peripheral neuropathic pain, neuropathic trigeminal pain, bone cancer pain and/or chemotherapy-induced pain, and conditions associated with cortical spreading depression (CSD).

In some embodiments, the pharmaceutical composition or dosage form is orally administered once daily.

EXAMPLE

The following examples are provided to enable one skilled in the art to practice the invention and are merely illustrative of the invention. The examples should not be read as limiting the scope of the invention as defined in the claims.

Example 1—Capsule of Lacosamide Comprising Two Dosage Form: Pellets and Tablet polyethylene glycol was coated on the surface of the drug-loaded pellet, to obtain a desired different level of coating weight gain. The inlet airflow rate and the material temperature were adjusted to prevent spray drying of the coating solution or too wet pellets. The particle size of the prepared pellets was about 600 μm to about 1200 um.

Production process of immediate release tablet. Lacosamide and microcrystalline cellulose were mixed, then screened through a 1600 μm sieve, and transferred to a wet granulation machine for pre-mixing for 10 minutes. Povidone was dissolved completely in purified water as a binder and the binder was added to the wet granulation machine in a nebulized form using a spray gun. After the process, the material was dried and sized through a 1600 μm sieve. Finally, a lubricant was added for mixing. The tablets were pressed using an elliptical punch. Finally the suspension of pH dependent agents, Eudragit L 30D-55, Eudragit FS 30D, Triethyl citrate and Mono and Diglycerides were used to coat on the surface. The density of first dosage form is 0.48 g/ml and the density of second dosage form is 1.01 g/ml.

TABLE 1

First dosage form: pellets and Second dosage form: tablet

| Composition | Formulation (mg) | | | |
|---|---|---|---|---|
| | E-A-1 | E-A-2 | E-A-3 | E-A-4 |
| ER portion in the first pellets dosage form | | | | |
| Microcrystalline Cellulose Pellet | 72.0 | 72.0 | 72.0 | 72.0 |
| Lacosamide | 288.0 | 288.0 | 288.0 | 288.0 |
| HPC | 25.5 | 32.1 | 32.1 | 32.1 |
| Ethanol | * | * | * | * |
| Opadry | 11.66 | 14.66 | 5.5 | / |
| Purified Water | * | * | * | * |
| Ethyl Cellulose | 62.1 | 40.0 | 70.0 | 40.0 |
| Triethyl citrate | 12.5 | 10.0 | 9.75 | 3.0 |
| Polyethylene glycol | 35.6 | 20.0 | 35.0 | 16.8 |
| 95% Ethanol | * | * | * | * |
| IR potion in the first pellets dosage form | | | | |
| Lacosamide | 32.0 | 32.0 | 32.0 | 32.0 |
| Povidone | 3.0 | 2.0 | 2.0 | 2.0 |
| Purified Water | * | * | * | * |
| ER portion in the second tablet dosage form | | | | |
| Lacosamide | 80.0 | 80.0 | 80.0 | 80.0 |
| Povidone | 6 | 2.0 | / | 20.0 |
| Carbomer | 5.0 | 10.0 | 6.0 | 1.0 |
| Colloidal silicon dioxide | 2.0 | 2.0 | 2.0 | 1.0 |
| Magnesium stearate | 1.0 | 1.0 | 1.0 | 1.0 |
| 80% Ethanol | * | * | * | * |
| Enteric delay release portion in the second tablet dosage form | | | | |
| Eudragit FS 30D | 2.35 | 3.5 | 1.0 | 1.6 |
| Eudragit L 30D-55 | 2.35 | 1.5 | 3.0 | 0.8 |
| Polysorbates 80 | 0.09 | 0.09 | 0.09 | 0.09 |
| Mono and Diglycerides | 0.24 | 0.24 | 0.24 | 0.24 |
| Triethyl citrate | 0.47 | 0.47 | 0.35 | 0.35 |
| 80% Ethanol | * | * | * | * |

*Solvent, evaporating during the process

The different portions of E-A-1, E-A-2, E-A-3, E-A-4 formulation can be combined with each other in any way.

Production process of the first dosage form. A suspension of lacosamide was used as the drug coating solution, and the drug coating solution was uniformly coated on an inert microcrystalline cellulose pellet by using a fluidized bed, to achieve a desired drug loading level, and then an extended release coating solution consisting of ethyl cellulose and Production process of capsules. The membrane controlled extended release pellets and immediate release tablet were filled into capsules using a capsule filling machine.

Capsule size. The Capsule of lacosamide and pharmaceutical composition can be encapsulated in 0.91 ml~1.02 ml capsule (size 00 to size 00EL capsule).

The in vitro dissolution was determined using a USP type I dissolution system (Basket Apparatus) at 100 rpm and a temperature of 37±0.5° C. in a dissolution medium of 900 ml-0.1 N HCl for 2 hours and then followed by USP type I dissolution system (Basket Apparatus) at 100 rpm and a temperature of 37±0.5° C. in a dissolution medium of 900 ml-pH 6.8 phosphate buffer. The dissolution samples were analyzed by high performance liquid chromatography (HPLC).

Based on the pharmacokinetic and bioavailability study of the dosage form in Example 1, the fluctuation and PTF of these lacosamide extended release capsules can be significantly reduced.

Example 2—Capsule of Lacosamide Comprising Two Dosage Form: Pellets and Tablet

TABLE 2

First dosage form: pellets and Second dosage form: tablet

| Composition | Formulation (mg) | | | |
|---|---|---|---|---|
| | E-B-1 | E-B-2 | E-B-3 | E-B-4 |
| ER portion in the first pellets dosage form | | | | |
| Microcrystalline Cellulose Pellet | 80.0 | 80.0 | 80.0 | 80.0 |
| Lacosamide | 288.0 | 304.0 | 272.0 | 256.0 |
| Povidone | 25.5 | 25.5 | 25.5 | 25.5 |
| Ethanol | * | * | * | * |
| Opadry | 8.0 | 8.0 | 8.0 | 8.0 |
| Purified Water | * | * | * | * |
| Ethyl Cellulose | 62.1 | 62.1 | 62.1 | 62.1 |
| Triethyl citrate | 12.5 | 12.5 | 12.5 | 12.5 |
| HPC | 35.6 | 35.6 | 35.6 | 35.6 |
| 95% Ethanol | * | * | * | * |
| IR potion in the first pellets dosage form | | | | |
| Lacosamide | 32.0 | 16.0 | 48.0 | 64.0 |
| Povidone | 4.0 | 4.0 | 4.0 | 4.0 |
| Purified Water | * | * | * | * |
| ER portion in the second tablet dosage form | | | | |
| Lacosamide | 80.0 | 80.0 | 80.0 | 80.0 |
| Povidone | 10.0 | 10.0 | 10.0 | 10.0 |
| Carbomer | 6.5 | 6.5 | 6.5 | 6.5 |
| Colloidal silicon dioxide | 2.0 | 2.0 | 2.0 | 2.0 |
| Magnesium stearate | 1.0 | 1.0 | 1.0 | 1.0 |
| 75% Ethanol | * | * | * | * |
| Enteric delay release portion in the second tablet dosage form | | | | |
| Eudragit FS 30D | 2.35 | 2.35 | 2.35 | 2.35 |
| Eudragit L 30D-55 | 2.35 | 2.35 | 2.35 | 2.35 |
| Polysorbates 80 | 0.09 | 0.09 | 0.09 | 0.09 |
| Mono and Diglycerides | 0.24 | 0.24 | 0.24 | 0.24 |
| Triethyl citrate | 0.47 | 0.47 | 0.47 | 0.47 |
| 80% Ethanol | * | * | * | * |

*Solvent, evaporating during the process

The different portions of E-C-1, E-C-2, E-C-3, E-C-4 formulation can be combined with each other in any way.

The density of first dosage form is 0.46 g/ml to 0.54 g/ml and the density of second dosage form is 1.02 g/ml Example 3—Capsule of Lacosamide Comprising Two Dosage Forms: Pellets and Tablet

TABLE 3

First dosage form: pellets and Second dosage form: tablet

ER portion in the first pellets dosage form Formulation (mg)

| Composition | E-C-1 | E-C-2 | E-C-3 | E-C-4 |
|---|---|---|---|---|
| Microcrystalline Cellulose Pellet | 72.0 | 72.0 | 72.0 | 72.0 |
| Lacosamide | 288.0 | 324.0 | 252.0 | 216.0 |
| Povidone | 30.0 | 30.0 | 30.0 | 30.0 |
| Ethanol | * | * | * | * |
| Opadry | 8.5 | 8.5 | 8.5 | 8.5 |
| Purified Water | * | * | * | * |
| Ethyl Cellulose | 60.5 | 60.5 | 60.5 | 60.5 |
| Triethyl citrate | 10.15 | 10.15 | 10.15 | 10.15 |
| HPMC | 35.7 | 35.7 | 35.7 | 35.7 |
| 95% Ethanol | * | * | * | * |

IR potion in the first pellets dosage form Formulation (mg)

| Composition | E-C-1 | E-C-2 | E-C-3 | E-C-4 |
|---|---|---|---|---|
| Lacosamide | 32.0 | 36.0 | 28.0 | 24.0 |
| Povidone | 2.0 | 2.0 | 2.0 | 2.0 |
| Opadry | 18.14 | 18.14 | 18.14 | 18.14 |
| Purified Water | * | * | * | * |

ER portion in the second tablet dosage form Formulation (mg)

| Composition | E-C-1 | E-C-2 | E-C-3 | E-C-4 |
|---|---|---|---|---|
| Lacosamide | 80.0 | 40.0 | 120.0 | 160.0 |
| CMC-Na | 6.0 | 6.0 | 6.0 | 6.0 |
| MCC PH 101 | / | 40.0 | / | / |
| Carbomer | 5.2 | 5.2 | 5.2 | 5.2 |
| Colloidal silicon dioxide | 2.0 | 2.0 | 2.0 | 2.0 |
| Magnesium stearate | 1.0 | 1.0 | 1.0 | 1.0 |
| 80% Ethanol | * | * | * | * |

Enteric delay release portion in the second tablet dosage form Formulation (mg)

| Composition | E-C-1 | E-C-2 | E-C-3 | E-C-4 |
|---|---|---|---|---|
| Eudragit FS 30D | 2.0 | 2.0 | 2.0 | 2.0 |
| Eudragit L 30D-55 | 2.0 | 2.0 | 2.0 | 2.0 |
| Polysorbates 80 | 0.04 | 0.04 | 0.04 | 0.04 |
| Mono and Diglycerides | 0.2 | 0.2 | 0.2 | 0.2 |
| Triethyl citrate | 0.4 | 0.4 | 0.4 | 0.4 |
| 80% Ethanol | * | * | * | * |

Example 4—Capsule of Lacosamide Comprising Two Dosage Form: Pellets and Tablet

TABLE 4

First dosage form: pellets and Second dosage form: tablet

ER portion in the first pellets dosage form Formulation (mg)

| Composition | E-D-1 | E-D-2 | E-D-3 | E-D-4 |
|---|---|---|---|---|
| Microcrystalline Cellulose Pellet | 80.0 | 80.0 | 80.0 | 80.0 |
| Lacosamide | 288.0 | 288.0 | 288.0 | 288.0 |
| Povidone | 28.8 | 28.8 | 28.8 | 28.8 |
| Ethanol | * | * | * | * |
| Opadry | 10.06 | 10.06 | 10.06 | 10.06 |
| Purified Water | * | * | * | * |
| Ethyl Cellulose | 62.0 | 62.0 | 62.0 | 62.0 |
| Triethyl citrate | 12.5 | 12.5 | 12.5 | 12.5 |
| Sodium carboxymethyl-cellulose | 40.5 | 40.5 | 40.5 | 40.5 |
| 95% Ethanol | * | * | * | * |

IR potion in the first pellets dosage form Formulation (mg)

| Composition | E-D-1 | E-D-2 | E-D-3 | E-D-4 |
|---|---|---|---|---|
| Lacosamide | 32 | 32 | 32 | 32 |
| Povidone | 3.0 | 3.0 | 3.0 | 3.0 |
| Opadry | 18.14 | 18.14 | 18.14 | 18.14 |
| Purified Water | * | * | * | * |

ER portion in the second tablet dosage form Formulation (mg)

| Composition | E-D-1 | E-D-2 | E-D-3 | E-D-4 |
|---|---|---|---|---|
| Lacosamide | 80.0 | 80.0 | 80.0 | 80.0 |
| HPMC E15 | 5 | 5 | 5 | 5 |
| Carbomer | 5.2 | 5.2 | 5.2 | 5.2 |
| Magnesium stearate | 1.0 | 1.0 | 1.0 | 1.0 |
| Purified Water | * | * | * | * |

Enteric delay release portion in the second tablet dosage form Formulation (mg)

| Composition | E-D-1 | E-D-2 | E-D-3 | E-D-4 |
|---|---|---|---|---|
| Eudragit FS 30D | / | 3.13 | 1.56 | 4.5 |
| Eudragit L 30D-55 | 4.5 | 1.56 | 3.13 | / |
| Polysorbates 80 | 0.09 | 0.09 | 0.09 | 0.09 |
| Mono and Diglycerides | 0.24 | 0.24 | 0.24 | 0.24 |
| Triethyl citrate | 0.47 | 0.47 | 0.47 | 0.47 |
| 80% Ethanol | * | * | * | * |

Example 5—Capsule of Lacosamide Comprising Two Dosage Form: Pellets and Tablet

TABLE 5

First dosage form: pellets and Second dosage form: tablet

ER portion in the first pellets dosage form Formulation (mg)

| Composition | E-E-1 | E-E-2 | E-E-3 | E-E-4 | E-E-5 |
|---|---|---|---|---|---|
| Microcrystalline Cellulose | 80.0 | 80.0 | 80.0 | 80.0 | 80.0 |
| Lacosamide | 270.0 | 202.5 | 135.0 | 101.25 | 67.5 |
| Povidone | 27.0 | 20.25 | 13.5 | 10.13 | 6.75 |
| Ethanol | * | * | * | * | * |
| Opadry | 10.06 | 10.06 | 10.06 | 10.06 | 10.06 |
| Purified Water | * | * | * | * | * |
| Ethyl Cellulose | 62.0 | 62.0 | 62.0 | 62.0 | 62.0 |
| Triethyl citrate | 12.5 | 12.5 | 12.5 | 12.5 | 12.5 |
| Sodium carboxymethylcellulose | 30.5 | 30.5 | 30.5 | 30.5 | 30.5 |
| 60% Ethanol | * | * | * | * | * |

IR potion in the first pellets dosage form Formulation (mg)

| Composition | E-E-1 | E-E-2 | E-E-3 | E-E-4 | E-E-5 |
|---|---|---|---|---|---|
| Lacosamide | 30.0 | 22.5 | 15.0 | 11.25 | 7.5 |
| Povidone | 3.0 | 2.25 | 1.5 | 1.13 | 0.75 |
| Opadry | 16.14 | 12.11 | 8.07 | 6.05 | 4.04 |
| Purified Water | * | * | * | * | * |

ER portion in the second tablet dosage form Formulation (mg)

| Composition | E-E-1 | E-E-2 | E-E-3 | E-E-4 | E-E-5 |
|---|---|---|---|---|---|
| Lacosamide | 100.0 | 75.0 | 50.0 | 37.5 | 25.0 |
| HPMC E15 | 3.0 | 3.0 | 3.0 | 3.0 | 3.0 |
| Carbomer | 6.0 | 4.5 | 3.0 | 2.25 | 1.5 |
| Magnesium stearate | 1.0 | 0.75 | 0.5 | 0.375 | 0.25 |
| Purified Water | * | * | * | * | * |

Enteric delay release portion in the second tablet dosage form Formulation (mg)

| Composition | E-E-1 | E-E-2 | E-E-3 | E-E-4 | E-E-5 |
|---|---|---|---|---|---|
| Eudragit FS 30D | 3.3 | 2.5 | 1.7 | 1.3 | 0.89 |
| Eudragit L 30D-55 | 3.3 | 2.5 | 1.7 | 1.3 | 0.89 |
| Polysorbates 80 | 0.13 | 0.1 | 0.07 | 0.5 | 0.4 |
| Mono and Diglycerides | 0.33 | 0.25 | 0.17 | 0.13 | 0.09 |
| Triethyl citrate | 0.33 | 0.25 | 0.17 | 0.13 | 0.09 |
| 80% Ethanol | * | * | * | * | * |

Example 6 Capsule of Lacosamide Comprising Two Dosage Form: Pellets and Tablet

TABLE 6

Capsule of Membrane controlled Extended release pellets and immediate release tablets of example 6

Membrane controlled Extended release pellets Formulation (mg)

| Composition | E1-1-1 | E1-1-2 | E1-1-3 | E1-1-4 |
|---|---|---|---|---|
| Microcrystalline Cellulose Pellet | 49.70 | 49.70 | 49.70 | 49.70 |
| Lacosamide | 200 | 200 | 200 | 200 |
| Povidone | 20 | 20 | 20 | 20 |
| Ethanol | * | * | * | * |
| Opadry | 4.32 | 4.32 | 4.32 | 4.32 |
| Purified Water | * | * | * | * |
| Ethyl Cellulose | 7.04 | 17.68 | 24.11 | 37.21 |
| Polyethylene Glycol | 4.69 | 11.90 | 16.06 | 24.80 |
| 95% Ethanol | * | * | * | * |

Immediate release tablets Formulation (mg)

| Composition | E1-2-1 | E1-2-2 | E1-2-3 | E1-2-4 |
|---|---|---|---|---|
| Lacosamide | 200 | 200 | 200 | 200 |
| microcrystalline cellulose | * | 20 | 30 | * |
| Povidone | 10 | 10 | * | * |
| magnesium stearate | 1 | 1.15 | 1.15 | 1 |
| Purified Water | * | * | * | * |

Example 7—Capsule of Membrane Controlled Extended Release Pellets and Immediate Release Tablets

TABLE 7

Capsule of Membrane controlled Extended release pellets and immediate release tablets of example 7

Membrane controlled Extended release pellets Formulation (mg)

| Composition | E2-1-1 | E2-1-2 | E2-1-3 | E2-1-4 |
|---|---|---|---|---|
| Extended-release core | | | | |
| Microcrystalline Cellulose Pellet | 49.70 | 49.70 | 49.70 | 49.70 |
| Lacosamide | 200 | 200 | 200 | 200 |
| Povidone | 20 | 20 | 20 | 20 |
| Ethanol | * | * | * | * |
| Opadry | 4.32 | 4.32 | 4.32 | 4.32 |
| Purified Water | * | * | * | * |
| Ethyl Cellulose | 7.04 | 17.68 | 24.11 | 37.21 |
| Polyethylene Glycol | 4.69 | 11.90 | 16.06 | 24.80 |
| 95% Ethanol | * | * | * | * |
| pH dependent coated | | | | |
| Eudragit L30 D-55 | 47.67 | 50.6 | 52.67 | 56.00 |
| Triethyl citrate | 1.40 | 1.50 | 1.58 | 1.68 |
| Tween 80 | 0.30 | 0.30 | 0.30 | 0.35 |
| Glycerin monostearate | 0.72 | 0.76 | 0.80 | 0.85 |
| Purified Water | * | * | * | * |

Immediate release tablets Formulation (mg)

| Composition | E2-2-1 | E2-2-2 | E2-2-3 | E2-2-4 |
|---|---|---|---|---|
| Lacosamide | 200 | 200 | 200 | 200 |
| microcrystalline cellulose | * | 20 | 30 | |
| Povidone | 10 | 10 | * | |
| magnesium stearate | 1 | 1.15 | 1.15 | 1 |
| Purified Water | 130 | 160 | 150 | 140 |

Example 8—Capsule of Membrane Controlled Extended Release Pellets and Immediate Release Tablets

TABLE 8

Capsule of Membrane controlled Extended release pellets and immediate release tablets of example 8

| Composition | Membrane controlled Extended release pellets Formulation (mg) | | | |
|---|---|---|---|---|
| | E3-1-1 | E3-1-2 | E3-1-3 | E3-1-4 |
| Extended-release core | | | | |
| Microcrystalline Cellulose Pellet | 49.70 | 49.70 | 49.70 | 49.70 |
| Lacosamide | 300 | 200 | 200 | 200 |
| Povidone | 20 | 20 | 20 | 20 |
| Ethanol | * | * | * | * |
| Opadry | 4.32 | 4.32 | 4.32 | 4.32 |
| Purified Water | * | * | * | * |
| Cellulose acetate | 7.04 | * | 7.04 | 7.04 |
| Eudragit FS 30D | * | 14.57 | * | * |
| Eudragit L 30D-55 | * | 29.17 | * | * |
| Triethyl citrate | * | 1.31 | | |
| Tween 80 | * | 0.26 | * | * |
| Glycerin monostearate | * | 0.66 | * | * |
| Ethyl Cellulose | * | 7.04 | * | * |
| Polyethylene Glycol | 4.69 | * | * | * |
| Hydroxypropyl methylcellulose E3 LV | * | * | 4.69 | * |
| Hydroxypropyl cellulose LF | * | * | * | 7.04 |
| lactose | * | 4.69 | * | * |
| Acetone | * | * | — | * |
| 95% Ethanol | * | * | * | * |

| Composition | Immediate release tablets Formulation (mg) | | | |
|---|---|---|---|---|
| | E3-2-1 | E3-2-2 | E3-2-3 | E3-2-4 |
| Lacosamide | 200 | 200 | 200 | 200 |
| microcrystalline cellulose | * | 20 | 30 | 3 |
| Povidone | 10 | 10 | * | * |
| Colloidal silicon dioxide | * | * | * | 5 |
| Magnesium stearate | 1 | 1.15 | 1.15 | 3 |
| Purified Water | * | * | * | * |

Example 9—Capsule of Membrane Controlled Extended Release Pellets and Immediate Release Tablets

TABLE 9

Capsule of Membrane controlled Extended release pellets and immediate release tablets of example 9

| Composition | Membrane controlled Extended release pellets Formulation (mg) |
|---|---|
| | E4-1-1 |
| Extended-release core | |
| Microcrystalline Cellulose Pellet | 67.5 |
| Lacosamide | 200 |
| Povidone | 13.35 |
| Ethanol | * |

TABLE 9-continued

Capsule of Membrane controlled Extended release pellets and immediate release tablets of example 9

| Opadry | 6.75 |
|---|---|
| Purified Water | * |
| Ethyl Cellulose | 4.70 |
| Hydroxypropyl methylcellulose | 3.13 |
| 95% Ethanol | * |
| Purified Water | * |
| Immediate release coated | |
| Lacosamide | 20 |
| polyvinylpyrrolidone | 2 |
| Purified Water | * |
| Opadry | 10 |

| Composition | Immediate release tablets core Formulation (mg) |
|---|---|
| | E4-2-1 |
| Lacosamide | 80 |
| microcrystalline cellulose | 10 |
| Sodium carboxymethyl cellulose | 8 |
| Colloidal silicon dioxide | 1 |
| Magnesium stearate | 1 |
| Purified Water | * |
| pH dependent coated | |
| Eudragit L 100 | 3.33 |
| Eudragit S 100 | 1.67 |
| Triethyl citrate | 0.5 |
| Talcum | 2.5 |
| 95% Ethanol | * |

Example 10—Capsule of Membrane Controlled Extended Release Pellets and Immediate Release Minitablets

TABLE 10

Capsule of Membrane controlled Extended release pellets and immediate release tablets of example 10

| Composition | Membrane controlled Extended release pellets Formulation (mg) |
|---|---|
| | E5-1-1 |
| Extended-release core | |
| Microcrystalline Cellulose Pellet | 67.5 |
| Lacosamide | 200 |
| Povidone | 13.35 |
| Ethanol | * |
| Opadry | 6.75 |
| Purified Water | * |
| Ethyl Cellulose | 4.70 |
| Hydroxypropyl methylcellulose | 3.13 |
| 95% Ethanol | * |
| Purified Water | * |
| Immediate release coated | |
| Lacosamide | 20 |
| polyvinylpyrrolidone | 2 |
| Purified Water | * |
| Opadry | 10 |

| Composition | Immediate release tablets core Formulation (mg) |
|---|---|
| | E5-2-1 |
| Lacosamide | 80 |
| microcrystalline cellulose | 10 |
| Sodium carboxymethyl cellulose | 8 |

TABLE 10-continued

Capsule of Membrane controlled Extended release pellets and immediate release tablets of example 10

| | |
|---|---|
| Colloidal silicon dioxide | 1 |
| Magnesium stearate | 1 |
| Purified Water | * |
| pH dependent coated | |
| Eudragit L 100 | 3.33 |
| Eudragit S 100 | 1.67 |
| Triethyl citrate | 0.5 |
| Talcum | 2.5 |
| 95% Ethanol | * |

Example 11—Capsule of Membrane Controlled Extended Release Pellets and Immediate Release Tablets

TABLE 11

Capsule of Membrane controlled Extended release pellets and immediate release tablets of example 11

| | Membrane controlled Extended release pellets Formulation (mg) | | | |
|---|---|---|---|---|
| Composition | E6-1-1 | E6-1-2 | E6-1-3 | E6-1-4 |
| Lacosamide | 80.0 | 80.0 | 80.0 | 80.0 |
| Microcrystalline Cellulose | 10 | 8.0 | 18.0 | 10.0 |
| Lactose Monohydrate | * | * | * | 8.0 |
| Crospovidone | 10 | 10.0 | 10.0 | 10.0 |
| Povidone | * | 2.0 | 2.0 | 1.0 |
| Water | q.s. | q.s. | q.s. | q.s. |
| Drug load (w/w) | 80.0% | 80.0% | 72.7% | 73.39% |
| Sieve mesh | — | 0.8 mm | — | 0.8 mm |
| Extrusion speed | — | 25 rpm | — | 25 rpm |
| Spheronization speed | — | 800 rpm | — | 800 rpm |
| Isolation layer | | | | |
| Opadry | 2.11 | 2.11 | 2.32 | 2.29 |
| Purified Water | * | * | * | * |
| Extended release layer | | | | |
| Ethyl Cellulose | 2.816 | 7.144 | 9.644 | 14.884 |
| Polyethylene Glycol | 1.876 | 4.76 | 6.424 | 9.92 |
| 95% Ethanol | * | * | * | * |

| | Immediate release tablets Formulation (mg) | | | |
|---|---|---|---|---|
| Composition | E6-2-1 | E6-2-2 | E6-2-3 | E6-2-4 |
| Lacosamide | 20 | 20 | 20 | 20 |
| Microcrystalline cellulose | * | 2 | 3 | * |
| Povidone | 1 | 1 | * | * |
| magnesium stearate | 0.1 | 0.12 | 0.12 | 0.1 |
| Purified Water | * | * | * | * |

Example 12—Capsule of Membrane Controlled Extended Release Pellets and Immediate Release Tablets

TABLE 12

Capsule of Membrane controlled Extended release pellets and immediate release tablets of example 12

| | Membrane controlled Extended release pellets Formulation (mg) | |
|---|---|---|
| Composition | E7-1-1 | E7-1-2 |
| Lacosamide | 80.0 | 80.0 |
| Microcrystalline Cellulose | 10.8 | 10.8 |
| Lactose Monohydrate | 6.8 | 6.8 |
| Crospovidone | 10.0 | 10.0 |
| Povidone | 0.7 | 0.7 |
| Water | q.s. | q.s. |
| Sieve mesh | 0.8 mm | 0.8 mm |
| Extrusion speed | 25 rpm | 25 rpm |
| Spheronization speed | 800 rpm | 800 rpm |
| Isolation layer | | |
| Opadry | 2.11 | 2.11 |
| Purified Water | * | * |
| Extended release layer | | |
| Ethyl Cellulose | 2.82 | — |
| Cellulose acetate | — | 2.816 |
| Polyethylene Glycol | 1.90 | — |
| Hydroxypropyl methylcellulose | — | 1.876 |
| Acetone | — | * |
| 95% Ethanol | * | * |
| Immediate release layer | | |
| Lacosamide | 10 | 10 |
| polyvinylpyrrolidone | 2 | 2 |
| Purified Water | * | * |
| Isolation layer | | |
| Opadry | 3.82 | 3.82 |
| Purified Water | * | * |
| Enteric layer | | |
| Eudragit L100 | 3.57 | 4.03 |
| Eudragit S100 | 1.80 | 1.35 |
| Triethyl Citrate | 0.55 | 0.55 |
| Talcum | 2.70 | 2.70 |
| 95% Ethanol | * | * |

| | Immediate release tablets Formulation (mg) |
|---|---|
| Composition | E7-2-2 |
| Lacosamide | 20 |
| Microcrystalline cellulose | 2 |
| Povidone | 1 |
| magnesium stearate | 0.12 |
| Purified Water | * |

Example 13—Capsule of Matrix Controlled Extended Release Pellets and Immediate Release Tablets

TABLE 13

Capsule of matrix controlled Extended release pellets and immediate release tablets of example 13

| Composition | matrix controlled Extended release pellets Formulation (mg) | | | |
|---|---|---|---|---|
| | E8-1-1 | E8-1-2 | E8-1-3 | E8-1-4 |
| Lacosamide | 300.0 | 300.0 | 300.0 | 300.0 |
| Microcrystalline Cellulose | 30 | 40 | 30 | 40 |
| Povidone | 7 | 10 | 7 | 10 |
| Hydroxypropyl methylcellulose E50 | 20 | — | 20 | — |
| Ethyl Cellulose | 30 | — | 30 | — |
| Eudragit RL | 20 | 20 | — | — |
| Eudragit RS | — | 10 | — | 10 |
| Purified Water | * | * | * | * |
| Enteric coated | | | | |
| Eudragit L30D-55 | — | — | 36.67 | 11.0 |
| Triethyl citrate | — | — | 1.1 | 1.1 |
| Monoglyceride stearate | — | — | 0.55 | 0.55 |
| Polysorbate 80 | — | — | 0.22 | 0.22 |
| Purified Water | — | — | * | * |

| Composition | Immediate release tablets Formulation (mg) E8-2-1 |
|---|---|
| Lacosamide | 100 |
| Povidone | 5.0 |
| magnesium stearate | 1.0 |
| Purified Water | * |

Example 14—Capsule of Matrix Controlled Extended Release Pellets and Matrix Controlled Extended Release Tablets

TABLE 14

Capsule of matrix controlled Extended release pellets and immediate release tablets of example 14

| Composition | matrix controlled Extended release pellets Formulation (mg) | | | |
|---|---|---|---|---|
| | E9-1-1 | E9-1-2 | E8-1-3 | E8-1-4 |
| Lacosamide | 300.0 | 300.0 | 300.0 | 300.0 |
| Microcrystalline Cellulose | — | — | 30 | 40 |
| Microcrystalline Cellulose pellets | 67.0 | 50 | — | — |
| Povidone | 25 | 30 | 7 | 10 |
| Hydroxypropyl methylcellulose E50 | 26.37 | — | 20 | — |
| Polyethylene glycol | — | 25 | — | — |
| Ethyl Cellulose | 46.95 | — | 30 | — |
| Cellulose acetate | 43 | — | — | — |
| Eudragit RL | — | — | — | 20 |
| Eudragit RS | — | — | — | 10 |
| 95% Ethyl alcohol | * | * | — | — |
| Acetone | — | * | — | — |
| Purified Water | — | — | * | * |

TABLE 14-continued

Capsule of matrix controlled Extended release pellets and immediate release tablets of example 14

| Composition | Immediate release tablets Formulation (mg) | | | |
|---|---|---|---|---|
| | E9-2-1 | E9-2-2 | E9-2-3 | E9-2-4 |
| Lacosamide | 100 | 100 | 100 | 100 |
| Hydroxypropyl methylcellulose E5 LV | 10 | — | — | 10 |
| Hydroxypropyl methylcellulose K100 LV | — | 5 | — | — |
| Ethyl Cellulose | 40 | — | — | — |
| Hydroxypropyl methylcellulose K100M CR | 20 | 50 | — | — |
| Hydroxypropyl methylcellulose K4M CR | — | — | 5 | — |
| Eudragit RS PO | — | — | 20 | — |
| Eudragit RL PO | — | — | 20 | — |
| Hexyldecyloctadecanol | — | — | — | 30 |
| Hydroxyethyl cellulose | — | — | — | 20 |
| Magnesium stearate | 1.5 | 1.5 | 1.5 | 1.5 |
| Purified Water | * | * | * | * |

Example 15—Capsule of Membrane Controlled/Matrix Controlled Extended Release Pellets and Matrix Controlled Extended Release Tablets

TABLE 15

Capsule of Membrane controlled/matrix controlled Extended release pellets and matrix controlled Extended release tablets of example 15

| Composition | Membrane controlled/matrix controlled Extended release pellets Formulation (mg) | | | |
|---|---|---|---|---|
| | E10-E9-1-1 | E10-E9-1-2 | E10-E8-1-3 | E10-E8-1-4 |
| Lacosamide | 280 | 280 | 300.0 | 300.0 |
| Microcrystalline Cellulose | — | — | 30 | 40 |
| Microcrystalline Cellulose pellets | 67.0 | 50 | — | — |
| Povidone | 25 | 30 | 7 | 10 |
| Hydroxypropyl methylcellulose E50 | 26.37 | 20 | — | — |
| Polyethylene glycol | — | 25 | — | — |
| Ethyl Cellulose | 46.95 | 30 | — | — |
| Cellulose acetate | — | 43 | — | — |
| Eudragit RL | — | — | — | 20 |
| Eudragit RS | — | — | — | 10 |
| 95% Ethyl alcohol | * | * | — | — |
| Purified Water | — | — | * | * |
| Acetone | — | * | — | — |
| Enteric coated | | | | |
| Eudragit L30D-55 | — | — | 36.67 | — |
| Triethyl citrate | — | — | 1.1 | — |
| Monoglyceride stearate | — | — | 0.55 | — |
| Polysorbate | — | — | 0.22 | — |
| Purified Water | — | — | * | — |
| Immediate release coated | | | | |
| Lacosamide | 40 | — | — | — |
| Povidone | 4 | — | — | — |
| 95% Ethyl alcohol | * | — | — | — |

TABLE 15-continued

Capsule of Membrane controlled/matrix controlled Extended release pellets and matrix controlled Extended release tablets of example 15

Isolation layer

| | | | | |
|---|---|---|---|---|
| Opadry | 14.70 | — | — | — |
| Purified Water | * | — | — | — |

Matrix controlled Extended release tablets Formulation (mg)

| Composition | E10-E9-2-1 | E10-E9-2-2 | E10-E9-2-3 | E10-E9-2-4 |
|---|---|---|---|---|
| Lacosamide | 80 | 80 | 100 | 100 |
| Hydroxypropyl methylcellulose E5 LV | 10 | — | — | 10 |
| Hydroxypropyl methylcellulose K100 LV | — | 5 | — | — |
| Ethyl Cellulose | 40 | — | — | — |
| Hydroxypropyl methylcellulose K100M CR | 20 | 50 | — | — |
| Hydroxypropyl methylcellulose K4M CR | — | — | 5 | — |
| Eudragit RS PO | — | — | 20 | — |
| Eudragit RL PO | — | — | 20 | — |
| Hexyldecyloctadecanol | — | — | — | 30 |
| Hydroxyethyl cellulose | — | — | — | 20 |
| Magnesium stearate | 1.5 | 1.5 | 1.5 | 1.5 |
| Purified Water | * | * | * | * |

Enteric coated

| | | | | |
|---|---|---|---|---|
| Eudragit L30D-55 | — | — | — | 8.0 |
| Triethyl citrate | — | — | — | 0.8 |
| Monoglyceride stearate | — | — | — | 0.4 |
| Polysorbate 80 | — | — | — | 0.16 |
| Purified Water | — | — | — | * |

Immediate release coated

| | | | | |
|---|---|---|---|---|
| Lacosamide | — | 40 | — | — |
| Povidone | — | 4 | — | — |
| 95% Ethyl alcohol | — | * | — | — |

Isolation layer

| | | | | |
|---|---|---|---|---|
| Opadry | — | 11.34 | — | — |
| Purified Water | — | * | — | — |

Example 16—Capsule of Membrane Controlled/Matrix Controlled Extended Release Pellets and Membrane Controlled Extended Release Tablets

TABLE 16

Capsule of Membrane controlled/matrix controlled Extended release pellets and membrane controlled Extended release tablets of example 16

Membrane controlled/matrix controlled Extended release pellets Formulation (mg)

| Composition | E11-E9-1-1 | E11-E9-1-2 | E11-E8-1-3 | E11-E8-1-4 | E11-1-1-5 |
|---|---|---|---|---|---|
| Lacosamide | 280 | 280 | 300.0 | 300.0 | 280.0 |
| Microcrystalline Cellulose | — | — | 30 | 40 | 30.0 |
| Microcrystalline Cellulose pellets | 67.0 | 50 | — | — | — |
| Povidone | 25 | 30 | 7 | 10 | 10 |
| Hydroxypropyl methylcellulose E50 | 26.37 | — | 20 | — | — |
| Polyethylene glycol | — | 25 | — | — | — |
| Ethyl Cellulose | 46.95 | — | 30 | — | — |
| Cellulose acetate | — | 43 | — | — | — |
| Eudragit RL | — | — | — | 20 | 20 |
| Eudragit RS | — | — | — | 10 | 10 |
| 95% Ethyl alcohol | * | * | — | — | — |
| Purified Water | — | — | * | * | * |

Enteric coated

| | | | | | |
|---|---|---|---|---|---|
| Eudragit L30D-55 | — | — | 36.67 | — | — |
| Triethyl citrate | — | — | 1.1 | — | — |
| Monoglyceride stearate | — | — | 0.55 | — | — |
| Polysorbate 80 | — | — | 0.22 | — | — |
| Purified Water | — | — | * | — | — |

Immediate release coated

| | | | | | |
|---|---|---|---|---|---|
| Lacosamide | 40 | — | — | — | — |
| Povidone | 4 | — | — | — | — |
| 95% Ethyl alcohol | * | — | — | — | — |
| Purified Water | * | — | — | — | — |

Isolation layer

| | | | | | |
|---|---|---|---|---|---|
| Opadry | 14.70 | — | — | — | — |
| Purified Water | * | — | — | — | — |

Membrane controlled Extended release tablets Formulation (mg)

| Composition | E11-2-1 | E11-2-2 | E11-2-3 | E11-2-4 | E11-2-5 |
|---|---|---|---|---|---|
| Lacosamide | 80 | 80 | 100 | 100 | 80 |
| Hydroxypropyl methylcellulose E5 LV | 12 | — | — | 10 | 10 |
| Hydroxypropyl methylcellulose K100 LV | — | 8 | — | — | — |
| Magnesium stearate | 1.0 | 1.0 | 1.5 | 1.5 | 1.5 |
| Purified Water | * | * | * | * | * |

Extended release coated

| | | | | | |
|---|---|---|---|---|---|
| Ethyl Cellulose | 10 | 10 | — | — | — |
| Cellulose acetate | — | — | 10 | 10 | 10 |
| Opadry | 3 | 3 | — | — | — |
| povidone | — | — | 3 | 3 | 3 |
| Purified Water | * | * | — | — | — |
| Acetone | — | — | * | * | * |

Enteric coated

| | | | | | |
|---|---|---|---|---|---|
| Eudragit L100-55 | — | — | — | 8.0 | 8.0 |
| Triethyl citrate | — | — | — | 0.8 | 0.8 |
| Talcum | — | — | — | 0.4 | 0.4 |
| Isopropanol | — | — | — | 0.16 | 0.16 |

Immediate release coated

| | | | | | |
|---|---|---|---|---|---|
| Lacosamide | — | 40 | — | — | 40 |
| Povidone | — | 4 | — | — | 4 |
| 95% Ethyl alcohol | — | * | — | — | * |

Isolation layer

| | | | | | |
|---|---|---|---|---|---|
| Opadry | — | 11.34 | — | — | 11.34 |
| Purified Water | — | * | — | — | * |

Example 17—Capsule of Immediate Release Pellets and Membrane Controlled/Matrix Controlled Extended Release Tablets

TABLE 17

Capsule of immediate release pellets and Membrane controlled/matrix controlled Extended release tablets of example 17

|  | immediate release pellets Formulation (mg) | |
| --- | --- | --- |
| Composition | E12-1-1 | E12-1-2 |
| Lacosamide | 20 | 20 |
| Microcrystalline Cellulose | 75 | — |
| Microcrystalline Cellulose pellets | — | 20 |
| Povidone | 5 | — |
| Hydroxypropyl methylcellulose E5 LV | — | 5 |
| 95% Ethyl alcohol | * | — |
| 70% Ethyl alcohol | — | * |
| Isolation layer | | |
| Opadry | 3.0 | 1.35 |
| Purified Water | * | * |

|  | Membrane controlled/matrix controlled Extended release tablets Formulation (mg) | |
| --- | --- | --- |
| Composition | E10-E9-2-2 | E11-2-1 |
| Lacosamide | 80 | 80 |
| Hydroxypropyl methylcellulose E5 LV | — | 12 |
| Hydroxypropyl methylcellulose K100 L V | 5 | — |
| Hydroxypropyl methylcellulose K100 M CR | 50 | — |
| Magnesium stearate | 1.5 | 1.0 |
| Purified Water | * | * |
| Extended release coated | | |
| Ethyl Cellulose | — | 10 |
| Cellulose acetate | — | — |
| Opadry | — | 3 |
| povidone | — | — |
| Purified Water | — | * |
| Acetone | — | — |

Example 18—Capsule of Membrane Controlled/Matrix Controlled Extended Release/Immediate Release Pellets and Bilayer/Osmotic Pump Extended Release Tablets

TABLE 18

Capsule of Membrane controlled/matrix controlled Extended release/immediate release pellets and bilayer/osmotic pump Extended release tablets of example 18

|  | Membrane controlled/matrix controlled Extended release/immediate release pellets Formulation (mg) | | |
| --- | --- | --- | --- |
| Composition | E13-1-1 | E13-1-2 | E13-1-2 |
| Lacosamide | 10 | 10 | 10 |
| Microcrystalline Cellulose | 70 | — | 50 |
| Microcrystalline Cellulose pellets | — | 30 | — |
| Povidone | 5 | 5 | 5 |
| Hydroxypropyl methylcellulose K4M | 15 | — | — |
| 95% Ethyl alcohol | — | * | — |
| 70% Ethyl alcohol | * | — | * |
| Isolation layer | | | |
| Opadry | 3.0 | 1.35 | 1.95 |
| Purified Water | * | * | * |
| Extended release coated | | | |
| Ethyl Cellulose | — | 2.0 | — |
| Triethyl citrate | — | 0.4 | — |
| povidone | — | 1.2 | — |
| Dehydrated Alcohol | — | * | — |
| Purified Water | — | * | — |

|  | bilayer/osmotic pump Extended release tablets Formulation (mg) | |
| --- | --- | --- |
|  | Extended release layer | Drug load layer |
| Composition | E13-2-1 | E13-2-2 |
| Lacosamide | 80 | 90 |
| Hydroxypropyl methylcellulose E5 LV | — | 5 |
| Microcrystalline Cellulose | 30 | 10 |
| Polyoxyethylene N-80 | — | 30 |
| Hydroxypropyl methylcellulose K4M | 20 | — |
| Magnesium stearate | 1.5 | — |
| Purified Water | * | * |

|  | Immediate release layer | Push layer |
| --- | --- | --- |
| Lacosamide | 10 | — |
| Hydroxypropyl methylcellulose E5 LV | 5 | 5 |
| Microcrystalline Cellulose | 20 | 10 |
| Magnesium stearate | 0.35 | 0.35 |
| Polyoxyethylene N-60K | — | 10 |
| Mannitol | — | 10 |
| Purified Water | * | * |

|  | Enteric coated | Function coated |
| --- | --- | --- |
| Eudragit L100-55 | 6.7 | — |
| Triethyl citrate | 0.67 | 3 |
| Talcum | 3.5 | — |
| Isopropanol | * | — |
| Cellulose acetate | — | 10 |
| Acetone | — | * |

Example 19—Capsule of Membrane Controlled/Matrix Controlled Extended Release Pellets and Immediate/Extended Release Particulates

TABLE 19

Capsule of Membrane controlled/matrix controlled Extended release pellets and immediate release particulates of example 19

| Composition | Membrane controlled/matrix controlled Extended release pellets Formulation (mg) | | | |
|---|---|---|---|---|
| | E10-E9-1-1 | E10-E9-1-2 | E10-E8-1-3 | E10-E8-1-4 |
| Lacosamide | 280 | 280 | 300.0 | 300.0 |
| Microcrystalline Cellulose | — | — | 30 | 40 |
| Microcrystalline Cellulose pellets | 67.0 | 50 | — | — |
| Povidone | 25 | 30 | 7 | 10 |
| Hydroxypropyl methylcellulose E50 | 26.37 | — | 20 | — |
| Polyethylene glycol | — | 25 | — | — |
| Ethyl Cellulose | 46.95 | — | 30 | — |
| Cellulose acetate | — | 43 | — | — |
| Eudragit RL | — | — | — | 20 |
| Eudragit RS | — | — | — | 10 |
| 95% Ethyl alcohol | * | * | — | — |
| Purified Water | — | — | * | * |
| Acetone | — | * | — | — |
| Enteric coated | | | | |
| Eudragit L30D-55 | — | — | 11.0 | — |
| Triethyl citrate | — | — | 1.1 | — |
| Monoglyceride stearate | — | — | 0.55 | — |
| Polysorbate 80 | — | — | 0.22 | — |
| Purified Water | — | — | * | — |
| Immediate release coated | | | | |
| Lacosamide | 40 | — | — | — |
| Povidone | 4 | — | — | — |
| 95% Ethyl alcohol | * | — | — | — |
| Isolation layer | | | | |
| Opadry | 14.70 | — | — | — |
| Purified Water | * | — | — | — |

| Composition | Immediate and Extended release particulates Formulation (mg) | | | |
|---|---|---|---|---|
| | E-14-2-1 | E-14-2-2 | E-14-2-3 | E-14-2-4 |
| Lacosamide | 80 | 120 | 100 | 100 |
| Ethyl Cellulose | — | — | 20 | 20 |
| Hydroxy propyl cellulose | 5 | 5 | — | — |
| Colloidal silicon dioxide | 1 | 1 | 1 | 1 |
| Purified Water | * | * | * | * |
| Enteric coated | | | | |
| Eudragit L30D-55 | — | 23.33 | — | 16.67 |
| Triethyl citrate | — | 0.7 | — | 0.5 |
| Monoglyceride stearate | — | 0.35 | — | 0.25 |
| Polysorbate 80 | — | 0.14 | — | 0.16 |
| Purified Water | — | * | — | * |

Example 20—Capsule of Membrane Controlled/Matrix Controlled Extended Release Tablets and Immediate/Extended Release Particulates

TABLE 20

Capsule of Membrane controlled/matrix controlled Extended release tablets and immediate release particulates of example 20

| Composition | Membrane controlled/matrix controlled Extended release tablets Formulation (mg) | |
|---|---|---|
| | E10-E9-2-2 | E11-2-1 |
| Lacosamide | 80 | 80 |
| Hydroxypropyl methylcellulose E5 LV | — | 12 |
| Hydroxypropyl methylcellulose K100 L V | 5 | — |
| Hydroxypropyl methylcellulose K100 M CR | 50 | — |
| Magnesium stearate | 1.5 | 1.0 |
| Purified Water | * | * |
| Extended release coated | | |
| Ethyl Cellulose | — | 10 |
| Cellulose acetate | — | — |
| Opadry | — | 3 |
| povidone | — | — |
| Purified Water | — | * |
| Acetone | — | — |

| Composition | Immediate and Extended release particulates Formulation (mg) | | | |
|---|---|---|---|---|
| | E-14-2-1 | E-14-2-2 | E-14-2-3 | E-14-2-4 |
| Lacosamide | 80 | 120 | 100 | 100 |
| Ethyl Cellulose | — | — | 20 | 20 |
| Hydroxy propyl cellulose | 5 | 5 | — | — |
| Colloidal silicon dioxide | 1 | 1 | 1 | 1 |
| Purified Water | * | * | * | * |
| Enteric coated | | | | |
| Eudragit L30D-55 | — | 23.33 | — | 16.67 |
| Triethyl citrate | — | 0.7 | — | 0.5 |
| Monoglyceride stearate | — | 0.35 | — | 0.25 |
| Polysorbate 80 | — | 0.14 | — | 0.16 |
| Purified Water | — | * | — | * |

Example 21—Capsule of Bilayer/Osmotic Pump Extended Release Tablets and Immediate/Extended Release Particulates

TABLE 21

Capsule of bilayer/osmotic pump Extended release tablets and immediate release particulates of example 16

| Composition | bilayer/osmotic pump Extended release tablets Formulation (mg) | |
|---|---|---|
| | Extended release layer E13-2-1 | Drug load layer E13-2-2 |
| Lacosamide | 80 | 90 |
| Hydroxypropyl methylcellulose E5 LV | — | 5 |
| Microcrystalline Cellulose | 30 | 10 |
| Polyoxyethylene N-80 | — | 30 |

TABLE 21-continued

Capsule of bilayer/osmotic pump Extended release tablets and immediate release particulates of example 16

| | | |
|---|---|---|
| Hydroxypropyl methylcellulose K4M | 20 | — |
| Magnesium stearate | 1.5 | — |
| Purified Water | * | * |

| | Immediate release layer | Push layer |
|---|---|---|
| Lacosamide | 10 | — |
| Hydroxypropyl methylcellulose E5 LV | 5 | 5 |
| Microcrystalline Cellulose | 20 | 10 |
| Magnesium stearate | 0.35 | 0.35 |
| Polyoxyethylene N-60K | — | 10 |
| Mannitol | — | 10 |
| Purified Water | * | * |

| | Enteric coated | Function coated |
|---|---|---|
| Eudragit L100-55 | 6.7 | — |
| Triethyl citrate | 0.67 | 3 |
| Talcum | 3.5 | — |
| Isopropanol | * | — |
| Cellulose acetate | — | 10 |
| Acetone | — | * |

| | Immediate and Extended release particulates Formulation (mg) | | | |
|---|---|---|---|---|
| Composition | E-14-2-1 | E-14-2-2 | E-14-2-3 | E-14-2-4 |
| Lacosamide | 80 | 120 | 100 | 100 |
| Ethyl Cellulose | — | — | 20 | 20 |
| Hydroxy propyl cellulose | 5 | 5 | — | — |
| Colloidal silicon dioxide | 1 | 1 | 1 | 1 |
| Purified Water | * | * | * | * |
| Enteric coated | | | | |
| Eudragit L30D-55 | — | 23.33 | — | 16.67 |
| Triethyl citrate | — | 0.7 | — | 0.5 |
| Monoglyceride stearate | — | 0.35 | — | 0.25 |
| Polysorbate 80 | — | 0.14 | — | 0.16 |
| Purified Water | — | * | — | * |

Example 22—Capsule of Membrane Controlled/Matrix Controlled Extended Release Pellets and Immediate Release Pellets

TABLE 22

Capsule of Membrane controlled/matrix controlled Extended release pellets and immediate release pellets of example 22

| | immediate release pellets Formulation (mg) | |
|---|---|---|
| Composition | E12-1-1 | E12-1-2 |
| Lacosamide | 20 | 20 |
| Microcrystalline Cellulose | 75 | — |
| Microcrystalline Cellulose pellets | — | 20 |
| Povidone | 5 | — |
| Hydroxypropyl methylcellulose E5 LV | — | 5 |
| 95% Ethyl alcohol | * | — |
| 70% Ethyl alcohol | — | * |
| Isolation layer | | |
| Opadry | 3.0 | 1.35 |
| Purified Water | * | * |

| | Membrane controlled/matrix controlled Extended release pellets Formulation (mg) | | | | |
|---|---|---|---|---|---|
| Composition | E11-E9-1-1 | E11-E9-1-2 | E11-E8-1-3 | E11-E8-1-4 | E11-1-1 |
| Lacosamide | 280 | 280 | 300.0 | 300.0 | 280.0 |
| Microcrystalline Cellulose | — | — | 30 | 40 | 30.0 |
| Microcrystalline Cellulose pellets | 67.0 | 50 | — | — | — |
| Povidone | 25 | 30 | 7 | 10 | 10 |
| Hydroxypropyl methylcellulose E50 | 26.37 | — | 20 | — | — |
| Polyethylene glycol | — | 25 | — | — | — |
| Ethyl Cellulose | 46.95 | — | 30 | — | — |
| Cellulose acetate | — | 43 | — | — | — |
| Eudragit RL | — | — | — | 20 | 20 |
| Eudragit RS | — | — | — | 10 | 10 |
| 95% Ethyl alcohol | * | * | — | — | — |
| Purified Water | — | — | * | * | * |
| Acetone | | | | | |

TABLE 22-continued

Capsule of Membrane controlled/matrix controlled Extended release pellets and immediate release pellets of example 22

Enteric coated

| | | | | | |
|---|---|---|---|---|---|
| Eudragit L30D-55 | — | — | 36.67 | — | — |
| Triethyl citrate | — | — | 1.1 | — | — |
| Monoglyceride stearate | — | — | 0.55 | — | — |
| Polysorbate 80 | — | — | 0.22 | — | — |
| Purified Water | — | — | * | — | — |

Immediate release coated

| | | | | | |
|---|---|---|---|---|---|
| Lacosamide | 40 | — | — | — | — |
| Povidone | 4 | — | — | — | — |
| 95% Ethyl alcohol | * | — | — | — | — |

Isolation layer

| | | | | | |
|---|---|---|---|---|---|
| Opadry | 14.70 | — | — | — | — |
| Purified Water | * | — | — | — | — |

Example 23—Capsule of Membrane Controlled/Matrix Controlled Extended Release Tablets and Immediate Release Tablets

TABLE 23

Capsule of Membrane controlled/matrix controlled Extended release tablets and immediate release tablets of example 23

| | Membrane controlled/matrix controlled Extended release tablets Formulation (mg) | |
|---|---|---|
| Composition | E10-E9-2-2 | E11-2-1 |
| Lacosamide | 80 | 80 |
| Hydroxypropyl methylcellulose E5 LV | — | 12 |
| Hydroxypropyl methylcellulose K100 L V | 5 | — |
| Hydroxypropyl methylcellulose K100 M CR | 50 | — |
| Magnesium stearate | 1.5 | 1.0 |
| Purified Water | * | * |

Extended release coated

| | | |
|---|---|---|
| Ethyl Cellulose | — | 10 |
| Cellulose acetate | — | — |
| Opadry | — | 3 |
| povidone | — | — |
| Purified Water | — | * |
| Acetone | — | — |

| | Immediate release tablets Formulation (mg) | | | |
|---|---|---|---|---|
| Composition | E1-2-1 | E1-2-2 | E1-2-3 | E1-2-4 |
| Lacosamide | 200 | 200 | 200 | 200 |
| microcrystalline cellulose | * | 20 | 30 | * |
| Povidone | 10 | 10 | * | * |
| magnesium stearate | 1 | 1.15 | 1.15 | 1 |
| Purified Water | * | * | * | * |

Example 24—Capsule of Membrane Controlled/Matrix Controlled Extended Release Particulates and Immediate Release Particulates

TABLE 24

Capsule of Membrane controlled/matrix controlled Extended release particulates and immediate release particulates of example 24

| | immediate release particulates Formulation (mg) | |
|---|---|---|
| Composition | E-14-2-1 | E-14-2-3 |
| Lacosamide | 80 | 100 |
| Ethyl Cellulose | — | 20 |
| Hydroxy propyl cellulose | 5 | — |
| Colloidal silicon dioxide | 1 | 1 |
| Purified Water | * | * |

| | Membrane controlled/matrix controlled Extended release particulates Formulation (mg) | |
|---|---|---|
| Composition | E-14-2-2 | E-14-2-4 |
| Lacosamide | 120 | 100 |
| Ethyl Cellulose | — | 20 |
| Hydroxy propyl cellulose | 5 | — |
| Colloidal silicon dioxide | 1 | 1 |
| Purified Water | * | * |

Enteric coated

| | | |
|---|---|---|
| Eudragit L30D-55 | 23.33 | 16.67 |
| Triethyl citrate | 0.7 | 0.5 |
| Monoglyceride stearate | 0.35 | 0.25 |
| Polysorbate 80 | 0.14 | 0.16 |
| Purified Water | * | * |

Example 25—Capsule of Membrane Controlled/Matrix Controlled Extended Release Particulates and Immediate Release Particulates and Membrane Controlled/Matrix Controlled Extended Release Pellets

TABLE 25

Capsule of Membrane controlled/matrix controlled Extended release particulates and immediate release particulates of example 25

| | immediate release particulates Formulation (mg) | |
|---|---|---|
| Composition | E-14-2-1 | E-14-2-3 |
| Lacosamide | 80 | 100 |
| Ethyl Cellulose | — | 20 |
| Hydroxy propyl cellulose | 5 | — |
| Colloidal silicon dioxide | 1 | 1 |
| Purified Water | * | * |

| | Membrane controlled/matrix controlled Extended release particulates Formulation (mg) | |
|---|---|---|
| Composition | E-14-2-2 | E-14-2-4 |
| Lacosamide | 120 | 100 |
| Ethyl Cellulose | — | 20 |
| Hydroxy propyl cellulose | 5 | — |
| Colloidal silicon dioxide | 1 | 1 |
| Purified Water | * | * |
| Enteric coated | | |
| Eudragit L30D-55 | 23.33 | 16.67 |
| Triethyl citrate | 0.7 | 0.5 |
| Monoglyceride stearate | 0.35 | 0.25 |
| Polysorbate 80 | 0.14 | 0.16 |
| Purified Water | * | — |

TABLE 25-continued

Capsule of Membrane controlled/matrix controlled Extended release particulates and immediate release particulates of example 25

| | Membrane controlled/matrix controlled Extended release pellets Formulation (mg) | | | |
|---|---|---|---|---|
| Composition | E10-E9-1-1 | E10-E9-1-2 | E10-E8-1-3 | E10-E8-1-4 |
| Lacosamide | 280 | 280 | 300.0 | 300.0 |
| Microcrystalline Cellulose | — | — | 30 | 40 |
| Microcrystalline Cellulose pellets | 67.0 | 50 | — | — |
| Povidone | 25 | 30 | 7 | 10 |
| Hydroxypropyl methylcellulose E50 | 26.37 | — | 20 | — |
| Polyethylene glycol | — | 25 | — | — |
| Ethyl Cellulose | 46.95 | — | 30 | — |
| Cellulose acetate | — | 43 | — | — |
| Eudragit RL | — | — | — | 20 |
| Eudragit RS | — | — | — | 10 |
| 95% Ethyl alcohol | * | * | — | — |
| Purified Water | — | — | * | * |
| Acetone | — | * | — | — |
| Enteric coated | | | | |
| Eudragit L30D-55 | — | — | 11.0 | — |
| Triethyl citrate | — | — | 1.1 | — |
| Monoglyceride stearate | — | — | 0.55 | — |
| Polysorbate 80 | — | — | 0.22 | — |
| Purified Water | — | — | * | — |
| Immediate release coated | | | | |
| Lacosamide | 40 | — | — | — |
| Povidone | 4 | — | — | — |
| 95% Ethyl alcohol | * | — | — | — |
| Isolation layer | | | | |
| Opadry | 14.70 | — | — | — |
| Purified Water | * | — | — | — |

Example 26 Capsule of Membrane Controlled/Matrix Controlled Extended Release Particulates and Immediate Release Particulates and Membrane Controlled/Matrix Controlled Extended Release Tablets

TABLE 26

Capsule of Membrane controlled/matrix controlled Extended release pellets and immediate release pellets and Membrane controlled/matrix controlled Extended release tablets of example 26

| | immediate release pellets Formulation (mg) | |
|---|---|---|
| Composition | E12-1-1 | E12-1-2 |
| Lacosamide | 20 | 20 |
| Microcrystalline Cellulose | 75 | — |
| Microcrystalline Cellulose pellets | — | 20 |
| Povidone | 5 | — |
| Hydroxypropyl methylcellulose | — | 5 |

TABLE 26-continued

Capsule of Membrane controlled/matrix controlled Extended release pellets
and immediate release pellets and Membrane controlled/matrix controlled
Extended release tablets of example 26

| | | |
|---|---|---|
| E5 LV | | |
| 95% Ethyl alcohol | * | — |
| 70% Ethyl alcohol | — | * |
| Isolation layer | | |
| Opadry | 3.0 | 1.35 |
| Purified Layer | * | * |

Membrane controlled/matrix controlled
Extended release pellets
Formulation (mg)

| Composition | E11-E9-1-1 | E11-E9-1-2 | E11-E8-1-3 | E11-E8-1-4 | E11-1-1 |
|---|---|---|---|---|---|
| Lacosamide | 280 | 280 | 300.0 | 300.0 | 280.0 |
| Microcrystalline Cellulose | — | — | 30 | 40 | 30.0 |
| Microcrystalline Cellulose pellets | 67.0 | 50 | — | — | — |
| Povidone | 25 | 30 | 7 | 10 | 10 |
| Hydroxypropyl methylcellulose E50 | 26.37 | — | 20 | — | — |
| Polyethylene glycol | — | 25 | — | — | — |
| Ethyl Cellulose | 46.95 | — | 30 | — | — |
| Cellulose acetate | — | 43 | — | — | — |
| Eudragit RL | — | — | — | 20 | 20 |
| Eudragit RS | — | — | — | 10 | 10 |
| 95% Ethyl alcohol | * | * | — | — | — |
| Purified Water | — | — | * | * | * |
| Acetone | | | | | |
| Enteric coated | | | | | |
| Eudragit L30D-55 | — | — | 36.67 | — | — |
| Triethyl citrate | — | — | 1.1 | — | — |
| Monoglyceride stearate | — | — | 0.55 | — | — |
| Polysorbate 80 | — | — | 0.22 | — | — |
| Purified Water | — | — | * | — | — |
| Immediate release coated | | | | | |
| Lacosamide | 40 | — | — | — | — |
| Povidone | 4 | — | — | — | — |
| 95% Ethyl alcohol | * | — | — | — | — |
| Isolation layer | | | | | |
| Opadry | 14.70 | — | — | — | — |
| Purified Water | * | — | — | — | — |

Membrane controlled/matrix controlled Extended
release tablets
Formulation (mg)

| Composition | E10-E9-2-2 | E11-2-1 |
|---|---|---|
| Lacosamide | 80 | 80 |
| Hydroxypropyl methylcellulose E5 LV | — | 12 |
| Hydroxypropyl methylcellulose K100 L V | 5 | — |
| Hydroxypropyl methylcellulose K100 M CR | 50 | — |
| Magnesium stearate | 1.5 | 1.0 |
| Purified Water | * | * |
| Extended release coated | | |
| Ethyl Cellulose | — | 10 |
| Cellulose acetate | — | — |
| Opadry | — | 3 |
| povidone | — | — |
| Purified Water | — | * |
| Acetone | — | — |

Example 27 Capsule of Membrane Controlled/Matrix Controlled Extended Release Pellets and Immediate Release Pellets and Immediate Release Tablets

TABLE 27

Capsule of Membrane controlled/matrix controlled Extended release pellets and immediate release pellets and immediate release tablets of example 27

| Composition | immediate release pellets Formulation (mg) | |
|---|---|---|
| | E12-1-1 | E12-1-2 |
| Lacosamide | 20 | 20 |
| Microcrystalline Cellulose | 75 | — |
| Microcrystalline Cellulose pellets | — | 20 |
| Povidone | 5 | — |
| Hydroxypropyl methylcellulose E5 LV | — | 5 |
| 95% Ethyl alcohol | * | — |
| 70% Ethyl alcohol | — | * |
| Isolation layer | | |
| Opadry | 3.0 | 1.35 |
| Purified Water | * | * |

| Composition | Membrane controlled/matrix controlled Extended release pellets Formulation (mg) | | | | |
|---|---|---|---|---|---|
| | E11-E9-1-1 | E11-E9-1-2 | E11-E8-1-3 | E11-E8-1-4 | E11-1-1 |
| Lacosamide | 280 | 280 | 300.0 | 300.0 | 280.0 |
| Microcrystalline Cellulose | — | — | 30 | 40 | 30.0 |
| Microcrystalline Cellulose pellets | 67.0 | 50 | — | — | — |
| Povidone | 25 | 30 | 7 | 10 | 10 |
| Hydroxypropyl methylcellulose E50 | 26.37 | — | 20 | — | — |
| Polyethylene glycol | — | 25 | — | — | — |
| Ethyl Cellulose | 46.95 | — | 30 | — | — |
| Cellulose acetate | — | 43 | — | — | — |
| Eudragit RL | — | — | — | 20 | 20 |
| Eudragit RS | — | — | — | 10 | 10 |
| 95% Ethyl alcohol | * | * | — | — | — |
| Purified Water | — | — | * | * | * |
| Acetone | | | | | |
| Enteric coated | | | | | |
| Eudragit L30D-55 | — | — | 36.67 | — | — |
| Triethyl citrate | — | — | 1.1 | — | — |
| Monoglyceride stearate | — | — | 0.55 | — | — |
| Polysorbate 80 | — | — | 0.22 | — | — |
| Purified Water | — | — | * | — | — |
| Immediate release coated | | | | | |
| Lacosamide | 40 | — | — | — | — |
| Povidone | 4 | — | — | — | — |
| 95% Ethyl alcohol | * | — | — | — | — |
| Isolation layer | | | | | |
| Opadry | 14.70 | — | — | — | — |
| Purified Water | * | — | — | — | — |

| Composition | Immediate release tablets Formulation (mg) | | | |
|---|---|---|---|---|
| | E22-2-1 | E22-2-2 | E22-2-3 | E22-2-4 |
| Lacosamide | 80 | 50 | 50 | 80 |
| microcrystalline cellulose | * | 20 | 30 | * |

TABLE 27-continued

Capsule of Membrane controlled/matrix controlled Extended release pellets and immediate release pellets and immediate release tablets of example 27

| | | | | |
|---|---|---|---|---|
| Povidone | 10 | 10 | * | * |
| magnesium stearate | 1 | 1.15 | 1.15 | 1 |
| Purified Water | * | * | * | * |

Example 28 Capsule of Membrane Controlled/Matrix Controlled Extended Release Tablets and Immediate Release Tablets and Membrane Controlled/Matrix Controlled Extended Release Pellets or Immediate Release Pellets

TABLE 28

Capsule of Membrane controlled/matrix controlled Extended release pellets and immediate release pellets and Membrane controlled/matrix controlled Extended release tablets of example 28

| | Immediate release tablets Formulation (mg) | | | |
|---|---|---|---|---|
| Composition | E9-2-1 | E9-2-2 | E9-2-3 | E9-2-4 |
| Lacosamide | 100 | 100 | 100 | 100 |
| Hydroxypropyl methylcellulose E5 LV | 10 | — | — | 10 |
| Hydroxypropyl methylcellulose K100 LV | — | 5 | — | — |
| Ethyl Cellulose | 40 | — | — | — |
| Hydroxypropyl methylcellulose K100M CR | 20 | 50 | — | — |
| Hydroxypropyl methylcellulose K4M CR | — | — | 5 | — |
| Eudragit RS PO | — | — | 20 | — |
| Eudragit RL PO | — | — | 20 | — |
| Hexyldecyloctadecanol | — | — | — | 30 |
| Hydroxyethyl cellulose | — | — | — | 20 |
| Magnesium stearate | 1.5 | 1.5 | 1.5 | 1.5 |
| Purified Water | * | * | * | * |

| | Membrane controlled/matrix controlled Extended release tablets Formulation (mg) | |
|---|---|---|
| Composition | E10-E9-2-2 | E11-2-1 |
| Lacosamide | 80 | 80 |
| Hydroxypropyl methylcellulose E5 LV | — | 12 |
| Hydroxypropyl methylcellulose K100 LV | 5 | — |
| Hydroxypropyl methylcellulose K100M CR | 50 | — |
| Magnesium stearate | 1.5 | 1.0 |
| Purified Water | * | * |
| Extended release coated | | |
| Ethyl Cellulose | — | 10 |
| Cellulose acetate | — | — |
| Opadry | — | 3 |
| povidone | — | — |
| Purified Water | — | * |
| Acetone | — | — |

| | Membrane controlled/matrix controlled Extended release/immediate release pellets Formulation (mg) | | |
|---|---|---|---|
| Composition | E13-1-1 | E13-1-2 | E13-1-2 |
| Lacosamide | 10 | 10 | 10 |
| Microcrystalline Cellulose | 70 | — | 50 |
| Microcrystalline Cellulose pellets | — | 30 | — |

TABLE 28-continued

Capsule of Membrane controlled/matrix controlled Extended release pellets and immediate release pellets and Membrane controlled/matrix controlled Extended release tablets of example 28

| | | | |
|---|---|---|---|
| Povidone | 5 | 5 | 5 |
| Hydroxypropyl methylcellulose K4M | 15 | — | — |
| 95% Ethyl alcohol | — | * | — |
| 70% Ethyl alcohol | * | — | * |
| Isolation layer | | | |
| Opadry | 3.0 | 1.35 | 1.95 |
| Purified Water | * | * | * |
| Extended release coated | | | |
| Ethyl Cellulose | — | 2.0 | — |
| Triethyl citrate | — | 0.4 | — |
| povidone | — | 1.2 | — |
| Dehydrated Alcohol | — | * | — |
| Purified Water | — | * | — |

It will be appreciated by persons skilled in the art that the present invention is not limited to what has been particularly shown and described. Rather, the scope of the present invention is defined by the claims which follow. It should further be understood that the above description is only representative of illustrative examples of embodiments. The description has not attempted to exhaustively enumerate all possible variations. The alternate embodiments may not have been presented for a specific portion of the invention, and may result from a different combination of described portions, or that other un-described alternate embodiments may be available for a portion, is not to be considered a disclaimer of those alternate embodiments. It will be appreciated that many of those un-described embodiments are within the literal scope of the following claims, and others are equivalent.

The invention claimed is:

1. A capsule enclosing lacosamide, comprising: (a) a first dosage form comprising a first portion of lacosamide, which comprises an immediate release (IR) portion of lacosamide and an extended release (ER) portion of lacosamide, wherein the first portion is substantially released at a pH ranging from 1.0 to 8.0 after the capsule is administered to a subject; and
(b) a second dosage form comprising a second portion of lacosamide configured for extended release, wherein the second portion of lacosamide is coated with an enteric layer comprising one or more pH dependent polymers and accounts for at least 10% of the total amount of lacosamide in the capsule, wherein the second portion of lacosamide is substantially released at a pH ranging from 5.5 to 8.0 after the capsule is administered to the subject;
wherein, when administered once a day, the capsule provides at steady state a ratio between $C_{min,ss}$ and $C_{max,ss}$ ranging from about 1:1.2 to about 1:3.0 and a peak-trough fluctuation (PTF) ranging from about 35% to about 65%, and
wherein the first portion of lacosamide ranges from about 65% to about 90% of the total amount of lacosamide in the capsule.

2. The capsule of claim 1, wherein the total amount of lacosamide in the capsule is selected so that, when orally administered once daily, the capsule provides at steady state a mean maximum plasma concentration (Cmax) ranging from about 10 to about 14 µg/ml and a mean minimum plasma concentration (Cmin) ranging from about 4 to about 10 µg/ml, and a PTF ranging from about 40% to about 60%.

3. The capsule of claim 2, which produces an $AUC_{0-6\,h,ss}$ ranging from about 30 to about 60 hr*µg/ml and a $AUC_{0-24\,h,ss}$ ranging from about 180 to about 250 hr*µg/ml.

4. The capsule of claim 2, wherein the total amount of lacosamide in the capsule is about 400 mg.

5. The capsule of claim 4, wherein the second dosage form has a density ranging from 0.60 g/cm$^3$ to 1.5 g/cm$^3$, wherein the density of the second dosage form is higher than the density of the first dosage form.

6. The capsule of claim 5, wherein the second dosage form has an in vitro dissolution according to the following:
(a) less than 10% in 2 hours;
(b) from about 10% to about 20% in 3 hours; and
(c) from about 40% to about 55% in 5 hours;
wherein the in vitro dissolution of the second dosage form is determined using a USP type 1 dissolution system (Basket Apparatus) at 100 rpm and at temperature of 37±0.5° C. in 900 ml of 0.1N HCL for 2 h hours and then followed by using a USP type 1 dissolution system (Basket Apparatus) at 100 rpm and at temperature of 37±0.5° C. in 900 ml of pH 6.8 phosphate buffer.

7. The capsule of claim 1, which is characterized by an in vitro dissolution according to the following:
(a) 10%-30% in 1 hour;
(b) 30%-70% in 2 hours;
(c) 50%-100% in 3 hours; and
(d) no less than 90% in 6 hours;
wherein the in vitro dissolution is determined using a USP type 1 dissolution system (Basket Apparatus) at 100 rpm and at temperature of 37±0.5° C. in 900 ml of pH 6.8 phosphate buffer.

8. The capsule of claim 1, wherein the first portion of lacosamide ranges from about 75% to about 90% of the total amount of lacosamide in the capsule.

9. The capsule of claim 1, wherein the IR portion encloses the ER portion for the first dosage form.

10. The capsule of claim 9, wherein the lacosamide of the ER portion is enclosed in an extended release layer.

11. The capsule of claim 1, wherein the second portion of lacosamide in the second dosage form is configured as a matrix for extended release.

12. The capsule of claim 1, wherein the second portion of lacosamide is substantially released at a pH ranging from 5.5 to 7.2 in vitro.

13. The capsule of claim 1, which is sized as 00 # or 00 #EL having an internal volume ranging from about 0.91 to about 1.05 ml.

14. The capsule of claim 1, wherein the IR portion and the ER portion in the first dosage form are in a ratio ranging from 1:8 to 1:10.

15. The capsule of claim 1, wherein the second dosage form is in the form of tablet, wherein the second dosage form has a higher lacosamide loading (w/w) than the first dosage form.

16. The capsule of claim 1, wherein the first dosage form comprises a plurality of beads or pellets, wherein each of the beads or pellets comprise the first portion of lacosamide.

17. A method of treating a neurological or psychiatric disease or condition in a subject, comprising administering to the subject the capsule of claim 1.

18. The method of claim 17, wherein the disease or condition is selected from the group consisting of epilepsy, migraine, essential tremor, restless limb syndrome, cluster headache, neuralgia, neuropathic pain, Tourette's syndrome, infantile spasm, anxiety, bipolar disorder, psychosis, mania, schizophrenia, depression, dementia, autism, obsessive compulsive disorder, post-traumatic stress disorder, attention deficit hyperactivity disorder, impulse control disorder, borderline personality disorder, addiction, chronic neurodegenerative disorder, acute neurodegeneration, and amyotrophic lateral sclerosis.

19. The method of claim 17, wherein the disease or condition is epilepsy.

* * * * *